(12) United States Patent
Taylor et al.

(10) Patent No.: US 8,199,635 B2
(45) Date of Patent: Jun. 12, 2012

(54) METHOD AND SYSTEM FOR NETWORK SETUP AND MAINTENANCE AND MEDIUM ACCESS CONTROL FOR A WIRELESS SENSOR NETWORK

(75) Inventors: James Laurence Taylor, Sherborne (GB); Venkatagopal Racherla, San Diego, CA (US); Jaya L. Jeyaseelan, Cupertino, CA (US); Naiel K. Askar, San Diego, CA (US); Michael D. Perry, Poway, CA (US); David S. Furuno, San Diego, CA (US)

(73) Assignee: General Atomics, San Diego, CA (US)

( * ) Notice: Subject to any disclaimer, the term of this patent is extended or adjusted under 35 U.S.C. 154(b) by 24 days.

(21) Appl. No.: 12/259,213

(22) Filed: Oct. 27, 2008

(65) Prior Publication Data

US 2010/0039933 A1   Feb. 18, 2010

Related U.S. Application Data

(60) Provisional application No. 61/088,313, filed on Aug. 12, 2008.

(51) Int. Cl.
*G01R 31/08* (2006.01)

(52) U.S. Cl. ....................................................... 370/217

(58) Field of Classification Search .................. 370/217, 370/254–258, 310, 310.1, 310.2, 328–341, 370/431–440, 464–465
See application file for complete search history.

(56) References Cited

U.S. PATENT DOCUMENTS

| | | | |
|---|---|---|---|
| 6,078,269 A | 6/2000 | Markwell et al. | |
| 6,208,247 B1 | 3/2001 | Agre et al. | |
| 6,218,879 B1 * | 4/2001 | Kilpatrick | 327/217 |
| 6,754,188 B1 | 6/2004 | Garahi et al. | |
| 6,807,165 B2 | 10/2004 | Belcea | |
| 6,859,831 B1 | 2/2005 | Gelvin et al. | |
| 6,975,613 B1 | 12/2005 | Johansson | |
| 6,986,161 B2 | 1/2006 | Billhartz | |
| 7,054,126 B2 | 5/2006 | Strutt et al. | |
| 7,075,476 B2 | 7/2006 | Kim | |
| 7,082,117 B2 | 7/2006 | Billhartz | |
| 7,304,976 B2 * | 12/2007 | Mao et al. | 370/338 |

(Continued)

OTHER PUBLICATIONS

Abramson, "The Throughput of Packet Broadcasting Channels", IEEE Transactions on Communications, Jan. 1977, pp. 117-128, vol. Com-25, No. 1, IEEE.

(Continued)

*Primary Examiner* — Kwang B Yao
*Assistant Examiner* — Jung-Jen Liu
(74) *Attorney, Agent, or Firm* — Fitch, Even, Tabin & Flannery, LLP

(57) ABSTRACT

A sensor network having a first command center and a first access node, comprising a wireless transceiver, coupled to the command center. The sensor network may also include a plurality of nodes individually comprising a wireless transceiver and a directional antenna, wherein each of the plurality of nodes is successively located in a downlink direction relative to the first access node, and is configured to wirelessly communicate via the directional antenna with at least one node of a first neighbor group in a first direction and at least one node of a second neighbor group in a second direction. In addition, a sensor device is individually coupled to at least one of the nodes, and is configured to provide sensor data for the first command center.

21 Claims, 12 Drawing Sheets

U.S. PATENT DOCUMENTS

| | | | |
|---|---|---|---|
| 7,656,851 B1* | 2/2010 | Ghanadan et al. | 370/338 |
| 7,715,308 B2* | 5/2010 | Ramaswamy | 370/217 |
| 7,719,989 B2* | 5/2010 | Yau | 370/248 |
| 2005/0064871 A1* | 3/2005 | Kawasaki et al. | 455/450 |
| 2005/0122233 A1* | 6/2005 | Isoyama et al. | 340/870.11 |
| 2005/0237975 A1* | 10/2005 | Santhoff et al. | 370/329 |
| 2005/0286610 A1* | 12/2005 | Dowla et al. | 375/130 |
| 2007/0195713 A1* | 8/2007 | Khan et al. | 370/254 |
| 2008/0007445 A1* | 1/2008 | Leach et al. | 342/21 |
| 2008/0137620 A1* | 6/2008 | Wang et al. | 370/337 |
| 2008/0147265 A1* | 6/2008 | Breed | 701/30 |
| 2008/0259879 A1* | 10/2008 | Connors et al. | 370/330 |
| 2009/0097443 A1* | 4/2009 | Pasanen et al. | 370/329 |
| 2009/0207747 A1* | 8/2009 | Kim et al. | 370/252 |
| 2009/0265140 A1* | 10/2009 | Murias et al. | 702/188 |
| 2010/0091823 A1* | 4/2010 | Retana et al. | 375/211 |

OTHER PUBLICATIONS

Akyildiz et al., "A Survey on Wireless Sensor Networks", IEEE Communications Magazine, Aug. 2002, pp. 102-114, vol. 40(8), IEEE.

Akyildiz et al., "Wireless Sensor Networks: A Survey", Computer Networks, Mar. 2002, pp. 393-422, vol. 38, Issue 4, Elsevier Science B.V.

Asada et al., "Low Power Wireless Communication and Signal Processing Circuits for Distributed Microsensors", International Symposium Circuits and Systems, Jun. 1997, pp. 2817-2820, IEEE.

Bandyopadhyay et al., "Enhancing the Performance of Ad Hoc Wireless Networks", 2006, pp. 2-4, Aurbach Publications.

Bao et al., "Transmission Scheduling in Ad Hoc Networks with Directional Antennas", in Proc. ACM Mobicom, Sep. 2002, Atlanta, Georgia, USA.

Bhatnagar et al., "Layer Net: A New Self-Organizing Network Protocol", IEEE Military Communications Conference Record, Jan. 1990, pp. 845-849, vol. 2, IEEE.

Broch et al., "A Performance Comparison of Multi-Hop Wireless Ad Hoc Network Routing Protocols", Proceedings of the 4th Annual ACM/IEEE International Conference on Mobile Computing and Networking, Oct. 25-30, 1998, pp. 1-13, IEEE.

Bult et al., "Low Power Systems for Wireless Microsensors", Proceedings of the International Symposium on Low Power Electronics and Design, Aug. 12-14, 1996, pp. 17-21, IEEE, Monterey, CA.

Choudhury, "Using Directional Antennas for Medium Access Control in Ad Hoc Networks", in Proc. ACM Mobicom, Sep. 2002, pp. 59-70, ACM, Atlanta, Georgia, USA.

Dong et al., "Low Power Signal Processing Architectures for Network Microsensors", International Symposium on Low Power Electronics and Design, 1997, pp. 173-175, ACM.

Elliott et al., "Self-Organizing, Self-Healing Wireless Networks", ICPWC, 2000, pp. 355-361, IEEE.

Ephremides et al., "A Design Concept for Reliable Mobile Radio Networks with Frequency Hopping Signaling", Proceedings of the IEEE, Jan. 1987, pp. 1-57, vol. 75, No. 1, IEEE.

Garcia-Luna-Aceves et al., "The Core-Assisted Mesh Protocol", IEEE Journal on Selected Areas in Communications, Aug. 1999, pp. 1-13, vol. 17, No. 8, IEEE.

Hoffman, "Smart Dust Mighty Motes for Medicine, Manufacturing, the Military and More", Computerworld Magazine (Online Version), www.computerworld.com/mobiletopics/mobile/story/0,10801,79572,00.html, Mar. 24, 2003, (last referenced Oct. 5, 2006), pp. 1-3, Computerworld.

Ko et al., "Medium Access Control Protocols Using Directional Antennas in Ad Hoc Networks", in Proc. IEEE Infocomm, Mar. 2000, pp. 1-9, IEEE.

Lewis, "Wireless Sensor Networks", Smart Environments: Technologies, Protocols, and Applications, 2004, pp. 1-18, New York.

Mainwaring et al., "Wireless Sensor Networks for Habitat Monitoring", In Proc. of the ACM International Workshop on Wireless Sensor Networks and Applications, Sep. 2002, pp. 1-10, ACM, Atlanta, Georgia, USA.

Nasipuri et al., "A MAC Protocol for Mobile Ad Hoc Networks Using Directional Antennas", in Proc. IEEE WCNC, 2000, pp. 1214-1219, IEEE.

Pottie et al., "Wireless Integrated Network Sensors (WINS): Principles and Practice", Communications of ACM, May 2000, pp. 1-10, vol. 43, No. 5, ACM.

Singh et al., "PAMAS: Power Aware Multi-Access Protocol with Signaling for Ad Hoc Networks", ACM Computer Communication Review, 1998, pp. 5-26, vol. 28, No. 3, ACM.

Sohrabi et al., "Protocols for Self-Organization of a Wireless Sensor Network", IEEE Personal Communications, 2000, pp. 16-27, vol. 7, No. 5, IEEE.

Tanenbaum, "Computer Networks", Third Edition, 1996, pp. 250-253 and pp. 262-265, Prentice Hall.

Tay et al., "Collision-Minimizing CSMA and its Applications to Wireless Sensor Networks," IEEE Journal on Selected Areas in Communications, Aug. 2004, pp. 1048-1057, vol. 22, No. 6, IEEE.

Tubaishat et al., "Sensor Networks: An Overview", IEEE Potentials, Apr. 2003, pp. 20-23, vol. 22, No. 2, IEEE.

Wikipedia, "Wireless Sensor Network", http://en.wikipedia.org/wiki/Sensor_network, Last Referenced Oct. 5, 2006, pp. 1-9, Wikipedia.

Ye et al., "An Energy-Efficient MAC Protocol for Wireless Sensor Networks", in Proc. of the 21st International Annual Joint Conference of the IEEE Computer and Communications Societies, Jun. 2002, pp. 1-10, New York, USA.

Young, "USAP: A Unifying Dynamic Distributed Multichannel TDMA Slot Assignment Protocol", IEEE Military Communications Conference Record, Jan. 1996, pp. 235-239, vol. 1, IEEE.

Young, "USAP Multiple Access: Dynamic Resource Allocation for Mobile Multihop Multichannel Wireless Networking", IEEE, 1999, pp. 1-5, IEEE.

* cited by examiner

| Parameters | Values |
|---|---|
| MAC address of neighbor 1 | |
| Antenna sector to use for communication with neighbor 1 | |
| Link direction of neighbor 1 | |
| Hop status of neighbor 1 | |
| GPS coordinates for neighbor 1 | |
| GPS coordinates for neighbor 1 | |
| MAC address of neighbor 2 | |
| Antenna sector to use for communication with neighbor 2 | |
| Link direction of neighbor 2 | |
| Hop status of neighbor 2 | |
| GPS coordinates for neighbor 2 | |
| GPS coordinates for neighbor 2 | |
| MAC address of neighbor 3 | |
| Antenna sector to use for communication with neighbor 3 | |
| Link direction of neighbor 3 | |
| Hop status of neighbor 3 | |
| GPS coordinates for neighbor 3 | |
| GPS coordinates for neighbor 3 | |
| MAC address of neighbor 4 | |
| Antenna sector to use for communication with neighbor 4 | |
| Link direction of neighbor 4 | |
| Hop status of neighbor 4 | |
| GPS coordinates for neighbor 4 | |
| GPS coordinates for neighbor 4 | |

METHOD AND SYSTEM FOR NETWORK SETUP AND MAINTENANCE AND MEDIUM ACCESS CONTROL FOR A WIRELESS SENSOR NETWORK

CROSS-REFERENCE TO RELATED APPLICATIONS

This application claims the benefit of U.S. Provisional Application No. 61/088,313, filed Aug. 12, 2008, which is incorporated in its entirety herein by reference.

STATEMENT REGARDING FEDERALLY SPONSORED RESEARCH OR DEVELOPMENT

The United States Government may have rights in this invention pursuant to Contract No. FA8650-04-C-1707, CDRL A001 between the USAF/AFMS Air Force Research Laboratory and General Atomics.

BACKGROUND OF THE INVENTION

1. Field of the Invention

The present invention relates generally to wireless sensor networks, and more specifically to scheduling data transmissions and providing failed node recovery in a wireless sensor network.

2. Discussion of the Related Art

Wireless sensor networks have become popular in the recent years for forming a wireless network of various types of sensors that monitor conditions such as range, distance, temperature, sound, vibration, pressure, motion, or pollutants. Wireless sensor networks have been implemented in defense applications, environmental monitoring, habitat monitoring, surveillance and security, industrial/commercial inventory tracking, process monitoring and disaster recovery. Some wireless sensor networks are deployed as multi-hop "ad-hoc" networks. Typical ad-hoc networks include network nodes that are deployed with little or no existing infrastructure and form a network dynamically. These types of networks, typically, have limited capabilities for adapting to a failed node. In addition, conventional sensor networks typically implement omni-directional antennas for communication by the various nodes.

Various aspects of wireless sensor networks, including medium access control (MAC), task scheduling, and networking protocols, have been previously presented. Examples of such discussions can be found in U.S. Pat. Nos. 7,082,117, 7,075,476, 7,054,126, 6,986,161, 6,975,613, 6,807,165, 6,754,188, and 6,208,247.

In addition, wireless sensors and wireless sensor networks are described in various publications. Examples of such publications include various University of California Berkeley's projects such as Smart Dust, NEST, UCLA's NIMS and WINS projects, and the University of Florida's Atlas project. Commercial companies producing various types of sensor networks include Sensoria, Dust networks, Ember Networks, Crossbow technologies, Pervasa and Sensicast Systems.

SUMMARY OF THE INVENTION

In one embodiment, the invention can be characterized as a sensor network having a first command center and a first access node, comprising a wireless transceiver, coupled to the command center. The sensor network may also include a plurality of nodes individually comprising a wireless transceiver and a directional antenna, wherein each of the plurality of nodes is successively located in a downlink direction relative to the first access node, and is configured to wirelessly communicate via the directional antenna with at least one node of a first neighbor group in a first direction and at least one node of a second neighbor group in a second direction. In addition, a sensor device is individually coupled to at least one of the nodes, and is configured to provide sensor data for the first command center.

In another embodiment, the invention can be characterized as a method for scheduling data transmission in a wireless network having a plurality of nodes successively located in an uplink direction and providing a communication link to an access node coupled to a command center, wherein each given node of the plurality of nodes includes a neighbor group having at least two nodes located within an effective wireless transmission range in the uplink direction of the given node. The method includes transmitting data from a transmitting node of the plurality of nodes to a receiving node in an associated neighbor group of the plurality of neighbor groups during a first series of staggered time slots, and receiving the data at the receiving node during the first series of staggered time slots. The method further includes performing the transmitting and the receiving operations for multiple transmitting nodes and a corresponding multiple receiving nodes of the plurality of nodes during the first series of staggered time slots.

In a further embodiment, the invention may be characterized as a method for node failure recovery in a wireless network having a plurality of nodes successively located in a downlink direction relative to an access node coupled to a first command center, wherein each given node of the plurality of nodes includes a first neighbor group comprising nodes located within an effective wireless transmission range in the uplink direction of the given node and a second neighbor group comprising nodes located within an effective wireless transmission range in the downlink direction of the given node. The method includes detecting by a particular node of the plurality of nodes that a recurring communication has not been received by the particular node, within a time period, from a neighbor node in either of the first neighbor group or the second neighbor group. The method further includes communicating a first indicator to the command center indicating that the neighbor node is a failed node, and transmitting an update neighbor information command to all nodes which are in the first neighbor group and the second neighbor group of the failed neighbor node, causing such nodes to respectively update the first neighbor group and the second neighbor group to omit the failed neighbor node.

In a still further embodiment, the invention can be characterized as a sensor network including a plurality of nodes individually comprising a wireless transceiver and a directional antenna, wherein each of the plurality of nodes is successively located in a downlink direction relative to an access node, and is configured to wirelessly communicate via the directional antenna with at least one node of a first neighbor group in a first direction and at least one node of a second neighbor group in a second direction. Each of the plurality of nodes is further configured to repeatedly transmit a signal using different segments of the directional antenna. The sensor network further includes a sensor device individually coupled to at least one of the plurality of nodes and which is configured to provide sensor data, and a mobile node configured to be operable at varying geographical locations within an operational range of the sensor network, wherein the mobile node comprises a wireless transceiver and is configured to establish wireless communications with an associated node of the plurality of nodes responsive to receiving the signal from the associated node.

In a still further embodiment, the invention can be characterized as a method for discovering a mobile node operating in association with a sensor network having a plurality of nodes individually comprising a wireless transceiver and a directional antenna, wherein each of the plurality of nodes is successively located in a downlink direction relative to an access node. The method includes wirelessly communicating, by each of the plurality of nodes, with at least one node of a first neighbor group in a first direction and at least one node of a second neighbor group in a second direction. Further operations include repeatedly transmitting, by each of the plurality of nodes, a signal using different segments of the directional antenna, receiving the signal at a mobile node from an associated node of the plurality of nodes, and establishing wireless communication between the mobile node and the associated node responsive to receiving of the signal from the associated node.

BRIEF DESCRIPTION OF THE DRAWINGS

The above and other aspects, features and advantages of several embodiments of the present invention will be more apparent from the following more particular description thereof, presented in conjunction with the following drawings.

FIG. 7 depicts a parameter table which may be maintained by various nodes of the sensor network of FIG. 1, in accordance with embodiments of the present invention.

Figure 1:
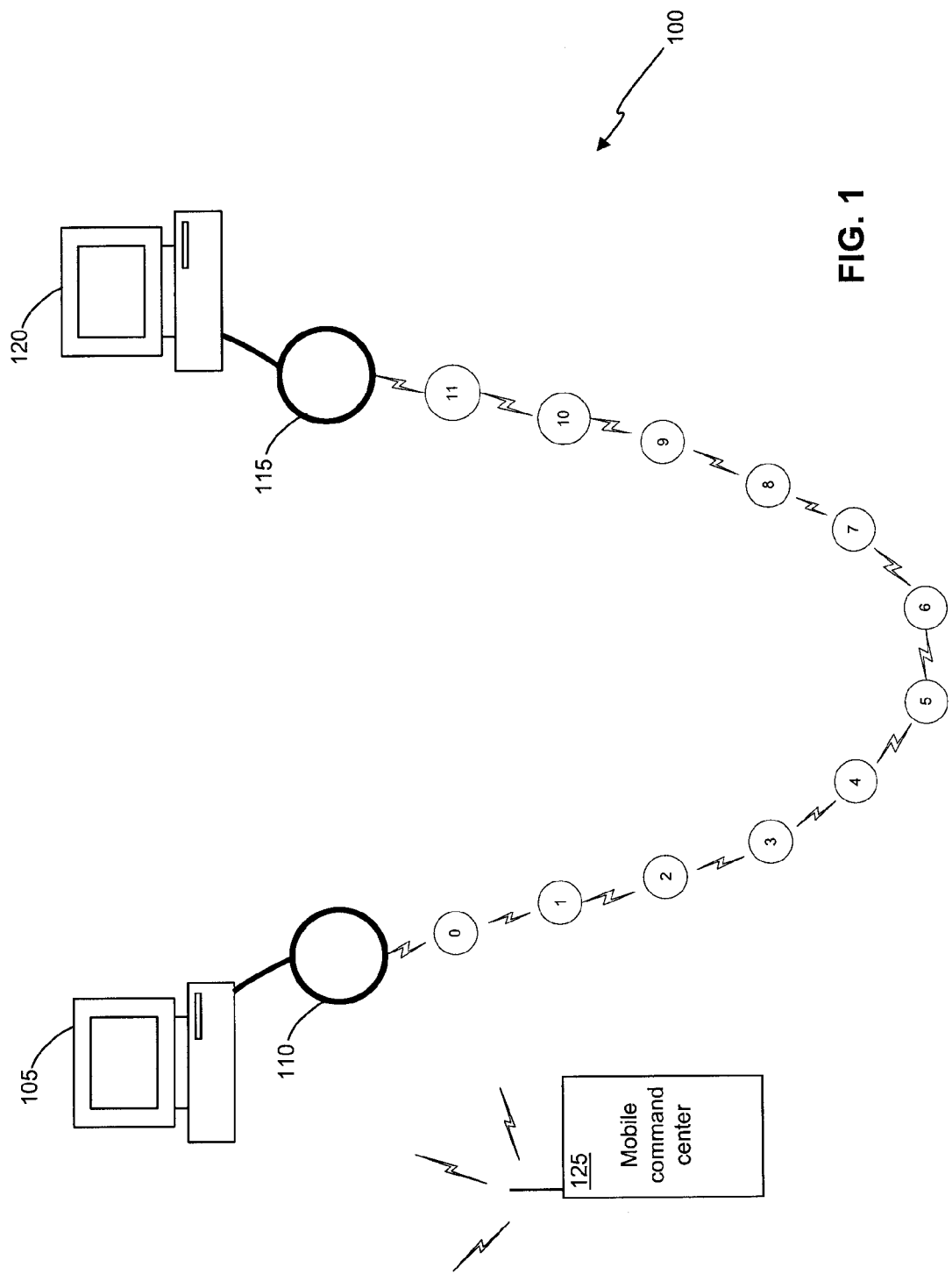
FIG. 1 is a diagram depicting a sensor network including various nodes, in accordance with an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

FIG. 1 is a diagram depicting a sensor network including various nodes in accordance with an embodiment of the present invention. In particular, sensor network 100 includes command center 105 and first access node 110, which is shown operatively coupled to the command center. The sensor network may be configured with one or more nodes in wireless communication with the command center. In the embodiment of FIG. 1, the sensor network is shown having a number of nodes (e.g., depicted as node 0 through node 11) successively located in a downlink direction relative to command center 105 and first access node 110. Sensor network 100 is shown optionally configured with second access node 115 and associated second command center 120. As used herein, the terms "uplink" and "downlink" respectively refer to the direction of communication toward and away from command center 105.

In one implementation, command center 105 may be realized using any suitable device that provides one or more functions such as control, storing, monitoring, processing, and displaying of data generated or otherwise provided by various nodes of sensor network 100. For example, the command center may include a specific or general purpose computer such as a personal computer, a laptop, a notebook, a personal digital assistant (PDA), a hand-held computer or device, and the like. The command center typically includes a user interface and display (e.g., an LCD, LED, CRT, plasma monitor, etc.) for displaying data provided by the nodes.

FIG. 1 is also shown having optional mobile command center 125, which may be configured with some or all of the functionality of command center 105. A distinction is that the mobile command center is typically configured to couple to sensor network 100 at any of the nodes, not just via an access node such as first and second access nodes 110, 115. In addition, the mobile command center, which is also referred to herein as a mobile node, can dynamically join and leave the sensor network. Mobile command centers are useful in situations in which some or all of nodes 0-11 are installed in locations that are hard to access. If a node fails, the mobile command center enables field personnel to easily isolate failed or malfunctioning nodes without having to physically access such failed nodes.

Command center 105, which is typically operated by human operators, generally includes applications which communicate (e.g., send and receive commands, data, and the like) with various nodes of the sensor network. Such applications may be implemented in software, hardware, and combinations thereof.

The communication link operatively coupling command center 105 and first access node 110 may be implemented using any suitable technique that supports the transfer of data and necessary signaling between these components. For example, the communication link may be implemented using conventional wired and/or wireless communication technologies such as USB, Ethernet, IEEE 1394, coaxial cables, serial or parallel cables, and optical fiber, among others.

Command center 105 may be located in close physical proximity (e.g., less than 1 meter) to first access node 110, but remote implementations are also possible. Furthermore, in some embodiments, command center 105 may be configured with network capabilities to support coupling with additional command centers or other computers. In such embodiments, the command center may be configured with a network link that comprises anything from a dedicated connection, to a local area network (LAN), to a wide area network (WAN), to a metropolitan area network (MAN), or even to the Internet. This arrangement may be implemented to permit communication between command center 105 and second command center 120.

First access node 110 is typically implemented to function as a terminating node that serves as a bridge between the nodes 0-11 and command center 105. A wireless transceiver may be implemented to support communications with one or more nodes. The typical range of the transceiver is such that a limited number of nodes are within the effective communication range of the transceiver of the first access node. Several embodiments include first access node 110 operating to directly communicate with only a terminating node (e.g., node 0) of the various sensor nodes. Redundancy may be achieved by permitting the first access node to alternatively communicate with other downlink nodes in the even that node 0 fails or malfunctions.

Each node of sensor network 100, such as nodes 0-11, generally includes capabilities to wirelessly communicate with one or more nodes of the sensor network. In an embodiment, each of the nodes 0-11 may be successively located in a downlink direction relative to first access node 110. Each node typically includes a wireless transceiver and a directional antenna, and is configured to wirelessly communicate via the directional antenna with at least one node of a neighbor group in a first direction (e.g., the uplink direction toward first access node 110), and at least one node of a neighbor group in a second direction (e.g., the downlink direction away from first access node 110).

A neighbor group refers to one or more nodes with which a given node communicates with in either the uplink direction or the downlink direction. For example, consider node 3, which may have a first neighbor group, in the uplink direction, of nodes 1 and 2. Node 3 may therefore communicate with either or both of nodes 1 and 2 since such nodes are in its neighbor group. Similarly, node 3 may have a second neighbor group, in the downlink direction, of nodes 4 and 5. Node 3 is therefore also permitted to communicate with either or both of nodes 4 and 5 of this second neighbor group.

No particular number of nodes is required to be included in a neighbor group. By way of non-limiting example, various embodiments will be described herein which include 1, 2, or more, nodes in the neighbor groups. However, such teachings apply equally to neighbor groups of other sizes. In some embodiments, a given node is configured to communicate directly with only those node or nodes in their associated neighbor group. Using again node 3 as an example, node 3 will therefore only communicate with nodes 1 and 2 in the uplink direction and nodes 4 and 5 in the downlink direction.

Generally, each node of sensor network 100 has the same sized neighbor groups, and the neighbor groups in the uplink and downlink direction are also typically the same size. However this is not a requirement and neighbor groups with different numbers of nodes may alternatively be implemented. One example includes the case of nodes 0 and 11, such that node 0 has a first or uplink neighbor group which includes first access node 110, and node 11 has a second or downlink neighbor group which includes second access node 115. Another example includes node 11 omitting a downlink neighbor group, which is often the case when the second access node and associated command center 120 are not implemented.

The various nodes 0-11 of the sensor system may use conventional wireless technologies for communication such as, for example, IEEE 802.11(g), IEEE 802.11(n), ultra-wideband (UWB), and the like. One benefit of UWB is that the underlying technology typically permits high data rates over relatively short distances, as compared to traditional narrowband communication techniques. In addition, many UWB solutions have relatively low power consumption, are cost effective, and can be robustly built with electronics that are easy to miniaturize using ASICs, for example. A typical UWB embodiment includes nodes which implement a wideband transceiver that transmits and receives communication bursts having a bandwidth of at least two, ten, or twenty, percent of a center frequency of the bursts.

In some embodiments, various nodes may include a directional antenna for communicating with the nodes of an associated neighbor group. A typical implementation includes use of segmented directional antenna patches for communication. The directional antenna has several advantages over an omni-directional antenna, for example. For instance, a directional antenna permits the nodes to extend communication range, maintain a given range with reduced power, and experience limited interference. One reason for the limited interference is that each node does not directly communicate with all of the nodes of the sensor network. Instead, each node directly communicates with only those nodes which are included in an associated uplink or downlink neighbor group.

Each node, by virtue of its associated directional antenna, typically communicates in only two directions; namely, the uplink direction toward first access node 110 and the downlink direction away from first access node 110. This arrangement may be accomplished using the directional antenna, which may be segmented to communicate in a desired direction (e.g., in a direction which permits communication with a node of an associated neighbor group). In this manner, the wireless sensor network according to several embodiments represents a linear arrangement of nodes, i.e., a linear sensor network. It is understood that as used herein, the term linear does not necessarily mean linear as in a straight line (e.g., from node 0 to node 11), but that the connections within a neighbor group are substantially in the linear direction of the uplink and downlink directions.

It is typically desirable for each of nodes 0-11 to know which antenna segment to use for communication with nodes located in the uplink and downlink neighbor groups. In one example, the antenna of a particular node may be configured or otherwise orientated during installation. In another example, a node may be configured during network set up to use a particular segment. For instance, the nodes may obtain the antenna segment information by scanning to detect the neighbor nodes. Another alternative includes the case in which a node has location information concerning a particular neighbor node (e.g., GPS coordinates of the node). In such a case, this location information may be used to select the appropriate antenna segment.

Figure 2:
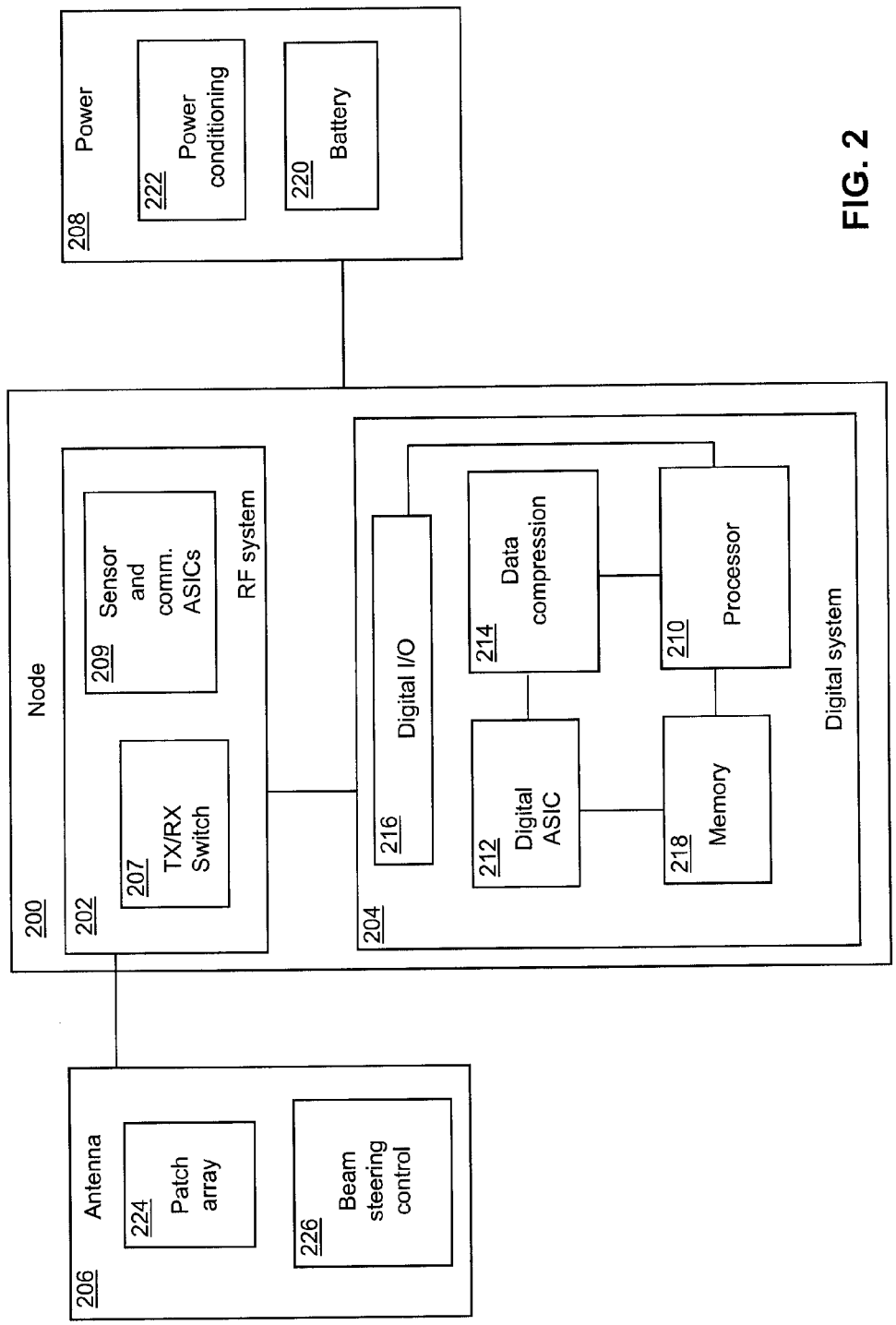
FIG. 2 is a block diagram depicting a node according to various embodiments of the present invention.

FIG. 2 is a block diagram depicting a node according to various embodiments of the present invention. Node 200 may be used to implement some or all of the nodes shown in FIG. 1, including nodes 0-11, the first and second access nodes, and mobile command center 125. Note that in the case of the mobile command center, an omni-directional antenna is often utilized instead of the directional antenna depicted in FIG. 2.

Node 200 is shown having RF system 202 coupled to digital system 204. The RF system is shown in communication with antenna 206, and power unit 208 is shown providing power to the node. RF system 202 may include components such as transmit and receive (TX/RX) switch 207 and sensor 209, which is shown also including various communication components implemented with an ASIC. The TX/RX switch functions with antenna 206.

In general, sensor 209 is a device configured to generate or otherwise obtain data which can be stored at the associated node and/or communicated back to command center 105. Particular examples of suitable sensors include temperature sensors, light sensors, motion sensors, audio sensors, radar sensors, and the like. Sensor 209 may also be configured to monitor range, distance, vibration, pressure, or pollutants. In addition, the sensor may be implemented as a still or video camera capturing images which can be communicated to command center 105. Low-power sensors are often implemented to maximize battery life of the associated node. A typical embodiment includes one or more sensors individually coupled (e.g., internally or externally) to at least one of the nodes 0-11 (FIG. 1).

Digital system 204 includes components such as processor 210, which is shown controlling digital ASIC 212 and data compression 214. Processor 210 typically controls the overall operations of the node. Input and output from the digital system may be handled by as suitable component such as digital I/O 216.

Memory 218 is generally used to store various types of data to support the processing, control, and storage requirements of node 200. Examples of such data include program instructions for applications operating on the node and data obtained from sensor 209. The memory may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

Power unit 208 provides needed power to node 200 and may be implemented by battery 220. Power conditioner 222 provides any power conditioning that may be desired. Antenna 206 is shown implemented as a directional antenna such that it includes a patch array 224 and beam steering control 226.

Returning to FIG. 1, in accordance with various embodiments, each of the nodes 0-11 may provide one or more generalized functions such as obtaining sensor data using an associated sensor 208, communicating such sensor data to a node in an uplink neighbor group, receiving sensor data from a node in a downlink neighbor group and relaying or repeating this sensor data to a node in the uplink neighbor group, communicating control data to nodes in both the uplink and downlink neighbor groups, and the like.

As noted above, some nodes may not include an associated sensor. Such nodes therefore function to relay or repeat sensor data provided by downlink nodes to a node in its associated uplink neighbor group. Accordingly, when a sensor is triggered based on a threshold condition, raw and/or processed sensor data may be communicated to command center 105 via uplink communications from an originating node.

The nodes 0-11 of sensor network 100 may be positioned in various configurations to meet desired application requirements. Typical examples include use of the sensor network in surveillance applications that may be implemented in various types of monitoring scenarios in industrial, military, security, and residential applications as well.

One embodiment includes positioning the nodes in fixed locations at distances on the order of 20-80 meters. The distance between nodes may be the same, or they may be positioned at different distances relative to each other. In addition, such nodes may also be positioned at different elevations to accommodate terrain changes, for example.

In addition, sensor network 100 may be implemented using most any number of nodes to meet the needs of a particular application. The number of nodes may range from as few as one or two nodes, to as many as a 1,000 nodes, or more. For clarity and ease of discussion, the sensor network 100 is shown having 12 nodes, referred to as nodes 0-11. An embodiment includes configuring the sensor network using a linear arrangement of nodes to cover a certain geographical region. Such an embodiment permits monitoring, via easily deployable sensor nodes, in diverse environment and weather conditions.

Operation of sensor network 100 in accordance with various embodiments of the present invention will now be described using, for example, the following exemplary parameters. In particular, such parameters include: (i) the nodes are nominally spaced at effectively equal distance; (ii) the communication range of each node is two hops, that is, a node can communicate with each of its two immediate or adjacent neighbor nodes in both the uplink and downlink directions; (iii) the interference range is four hops, that is, a node may receive interference from nodes up to four hops away; (iv) nodes may transmit, receive, relay, and combinations thereof data (e.g., control data, sensor data, status data, etc.); (v) each node has a set of segmented directional antenna patches and each antenna segment can be individually operated in order to maximize communication range; and (vi) one or more nodes may include an antenna that can be used in a quadrant mode (e.g., antenna broken into four quadrant segments) to support mobile command center discovery. It is understood that other embodiments may have different parameters, that is, other embodiments may include one or more of the parameters above plus one or more additional parameters.

Prior to actual operations, sensor network 100 will typically undergo preliminary processes such as synchronization and initialization. For example, during a typical synchronization process, first access node 110 may be configured to start the network, causing each of the remaining nodes 0-11 to be configured with the MAC address of a neighboring node to which it is to synchronize. This information may be carried in downlink synchronization packets such that each node obtains its neighbor address from the received synchronization packet. In addition, the synchronization packet may include other types of data such as, for example, the node identification (ID) of its uplink neighbor node.

Each of the nodes 0-11 may also be configured with a secondary MAC address (used as an alternate in the same direction as the node with the primary MAC address). This secondary MAC address is often utilized in situations in which the primary node fails. For example, consider the situation in which node 2 utilizes node 1 as its primary synchronization source and node 0 as its secondary synchronization source. Each of the other nodes of the sensor network may implement similar synchronization techniques. Toward the end of the network, last node 11 will typically recognize that it is the terminating node and consequently sends a start message to the uplink node 10 so that operations may start. Note the example of FIG. 1 shows last node 11 as being in communication with optional second command center 120 via second access node 115.

With regard to synchronization during network creation, first access node 110 starts the network by issuing a beacon as a downlink communication to adjacent node 0 on a periodic (e.g., every 500 ms) or other basis. This synchronization is sequential to the extent that each node 0-11 will synchronize in succession beginning with access node 110. For instance, after access node 110 is configured, successive node 0 will then be configured such that it will listen for the beacon transmitted by access node 110. Upon receiving the beacon, node 0 will synchronize to the network by setting its clock, for example, to the timestamp present within the beacon. Node 0 may also adjust for other factors such as the known fixed receive processing and propagation delays.

Once node 0 is configured, it will transmit a beacon to its downlink neighbor node 1. This process is typically repeated until all of the nodes of sensor network 100 have been configured. In this example, each node will synchronize to its previously installed uplink neighbor node (e.g., its primary synchronization source node) which has been previously synchronized.

With regard to synchronization in an established network, during a steady state, beacons may be transmitted in various uplink and downlink communication time slots (e.g., time slots of a superframe) at a periodic (e.g., 500 ms) or other rate. An exemplary superframe in accordance with various embodiments will be described with regard to a later figure.

Packets transmitted in superframe time slots often include an identification of the transmission slot utilized to transmit the packet. This feature, coupled with local timestamps of when packets are received at a particular node, may be used to adjust time slot timing to assist in maintaining node synchronization. According to one embodiment, to avoid or minimize oscillation, node timing may be achieved by aligning to downlink neighbor nodes only. According to an alternative embodiment, if the sensing and communication operations do not cause mutual interference when operated simultaneously, then the scheduling of the activity at the node may be simplified.

Network Initialization

Figure 3:
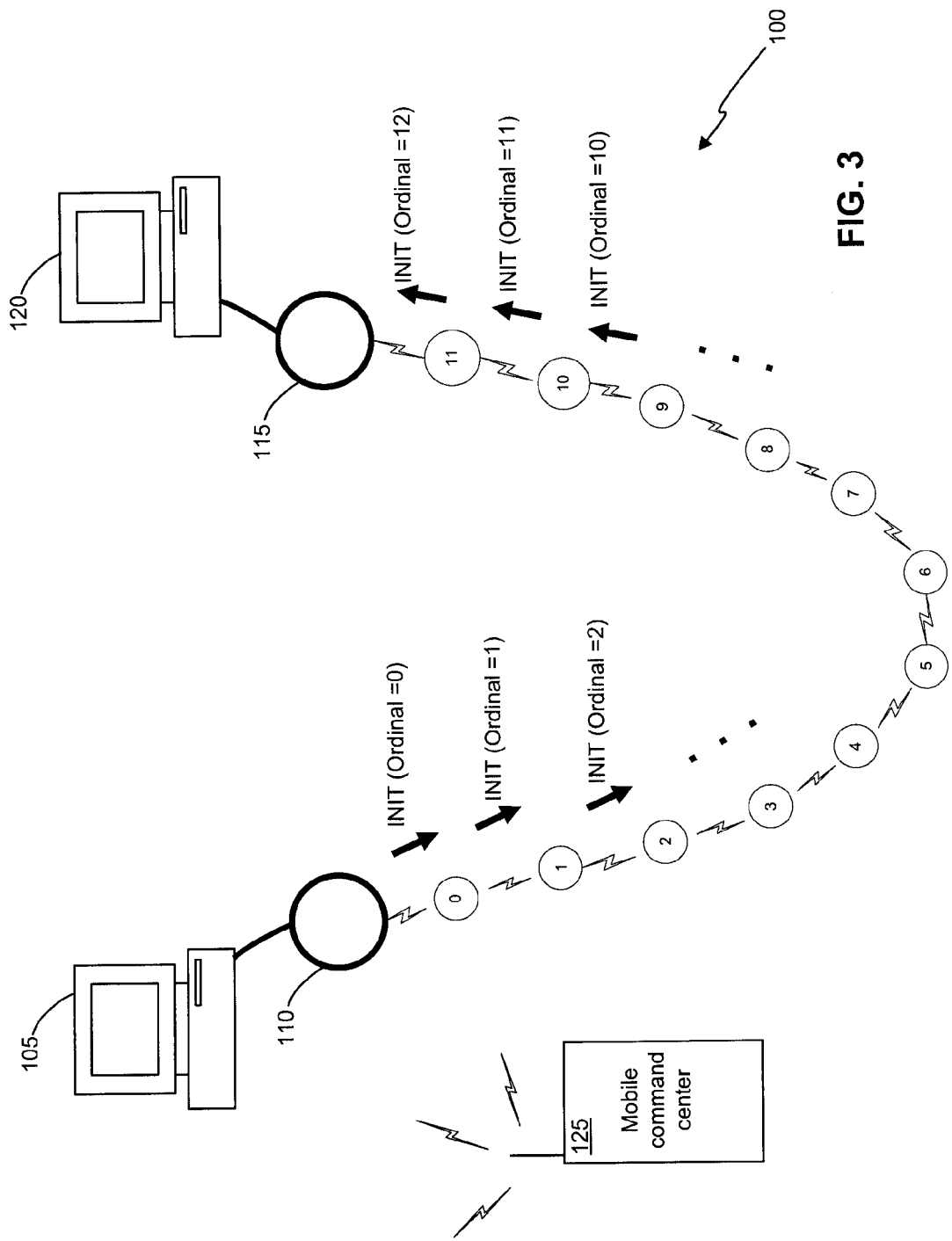
FIG. 3 depicts an example of assigning ordinals to nodes of the sensor network of FIG. 1, in accordance with an embodiment of the present invention.

FIG. 3 depicts an example of assigning ordinals to nodes of sensor network 100 in accordance with an embodiment of the present invention. As one example, during network initialization, each node is assigned an ordinal number corresponding to its relative location in sensor network 100. Such ordinals may be used by the MAC address scheduler to determine the order of operation of the various nodes for sensing and communication functions. During this procedure, command center 105 transmits an initialization (INIT) command frame, via first access node 110, to first node 0. Node 0 will receive the transmitted INIT command, causing the MAC, for example, of node 0 to set its ordinal value to an ORDINAL field of the INIT command. In this example, node 0 is assigned ordinal 0. The MAC of node 0 may then increment the value in the ORDINAL field (ordinal=1) and then retransmits the INIT command to the downlink neighbor node 1 which is then assigned ordinal 1.

This procedure is successively performed by each node of the sensor network resulting in the assignment of the ordinal values of all nodes 0-11. The last node 11 is shown transmitting the INIT command, via second access node 115, to the downlink second command center 120.

Figure 4:
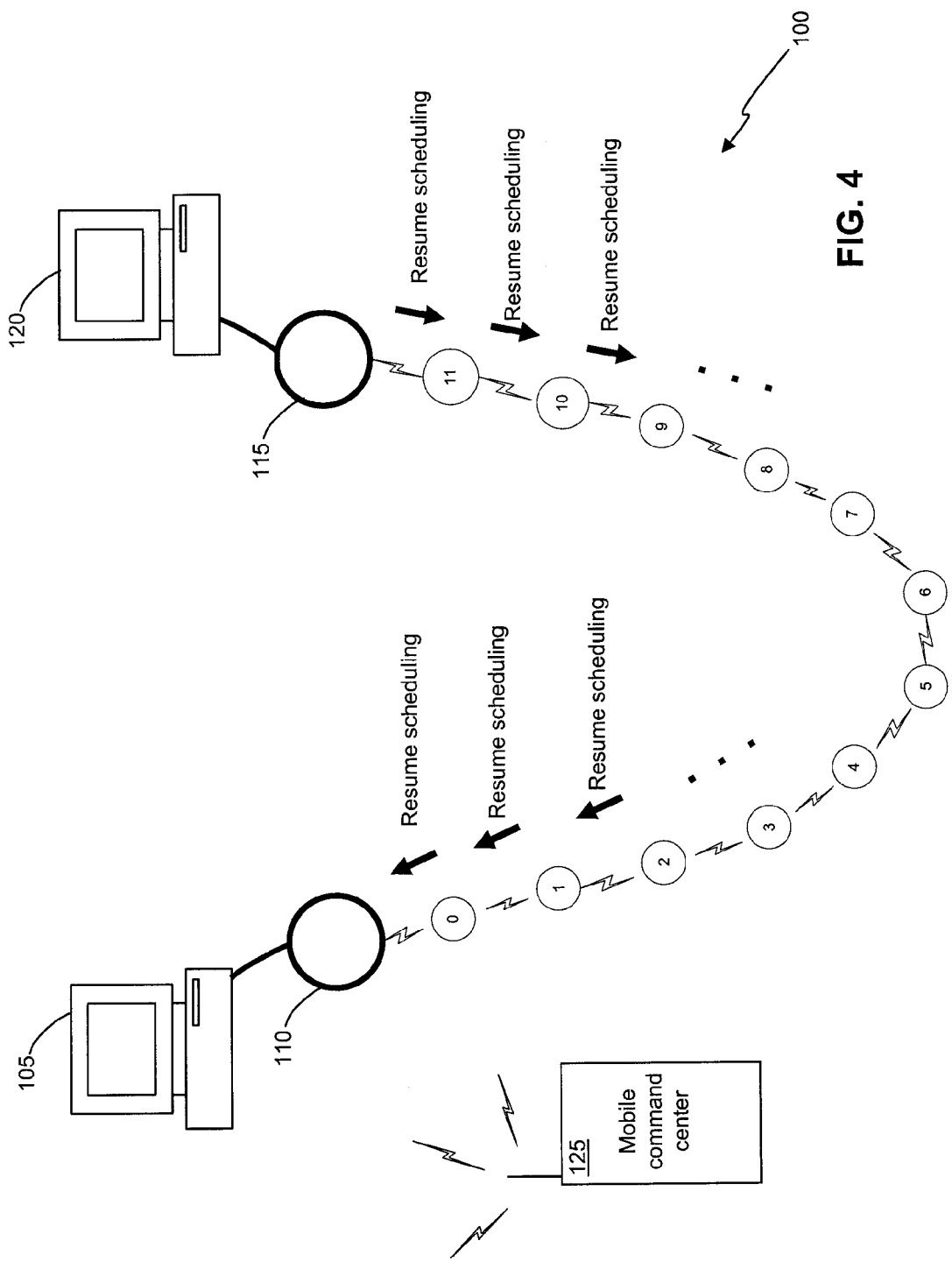
FIG. 4 depicts network initialization operations in which a scheduling command is issued in accordance with an embodiment of the present invention.

FIG. 4 depicts network initialization operations in which a scheduling command is issued in accordance with an embodiment of the present invention. This operation typically follows the initializing operation depicted in FIG. 3. In particular, consider FIG. 4 when second command center 120 receives this INIT command. In this scenario, the second command center responsively issues a RESUME-SCHEDULING command, which is communicated via the appropriate access nodes to the last node in the sensor network.

In FIG. 4, node 11 is the last node and receives the RESUME-SCHEDULING command from second access node 115. The RESUME-SCHEDULING command is shown successively retransmitted to each uplink neighbor until it is received by command center 105. After command center 105 has received the RESUME-SCHEDULING command frame, its MAC may then initiate normal scheduling and communication operations.

As noted above, certain embodiments do not include second command center 120 and associated second access node 115. In such embodiments, the RESUME-SCHEDULING command is alternatively generated by the last node of the sensor network, which in the case of FIG. 4 is node 11.

In accordance with some embodiments, probe transmission may be part of network initialization to allow for automatic discovery of neighboring nodes and the antenna sector segment to be used for communication. The probe transmission aspect may be implemented instead of using a static configuration in a node parameter table, for example.

In a typical probe transmission scenario, each node in turn sends a sequence of preambles on each antenna sector while the other nodes listen for such communications. Sending only preambles is often implemented to optimize scanning time. Based on these preambles, the listening nodes can determine their neighbors, which is a useful feature for later operations such as scheduling. Neighbors of a given node include those nodes which are in the single hop and multiple hop range in both the uplink and downlink directions. Put another way, the probing operation permits each node to determine the nodes which are to be included in its uplink and downlink neighbor groups.

The probing operation typically requires that the nodes know the schedule of transmission; that is, the order in which each node will perform the probing operation. Accordingly, probing operations typically follow the initial operation of ordinal assignments, as discussed above. One alternative includes configuring each of the nodes to transmit frames which include their respective IDs, thus allowing the nodes in their interference range to be computed from the received frames.

For reasons that will become clear, various scheduling techniques presented herein utilize information relating to a given node's set of interference nodes (i.e., the set of nodes in the uplink and downlink direction which would receive a signal transmitted from a given node). In certain cases, the interference set may be statically assigned to be the 2-hop or 4-hop, for example, uplink or downlink neighbors.

An alternative technique for determining the interference set includes each node to in turn transmit a signal, such as a preamble. The other nodes in the sensor network then listen during this transmission time and record, detect, or otherwise determine if the signal has been received. In addition, each of the listening nodes may compare the signal with a threshold above which interference is deemed to occur. Other methods may adapt the interference dynamically by adjusting the threshold depending on operational error rates, for example.

Regardless of the technique utilized, this process is repeated for each node in sensor network 100. After the last node has sent its signal, every node knows its respective interference set. If desired, the interference set may be exchanged by configuring nodes 0-11 to send this information to either or both of the command centers 105, 120. If the reception information is sent in both the uplink and downlink directions (e.g., sent to both command centers 105, 120), then all of the nodes will have received the interference set of all of the other nodes. According to these examples, nodes 0-11 may compute their interference sets, and thus their respective schedules, based upon the measured interference set instead of a statically assigned interference set.

Figure 5:
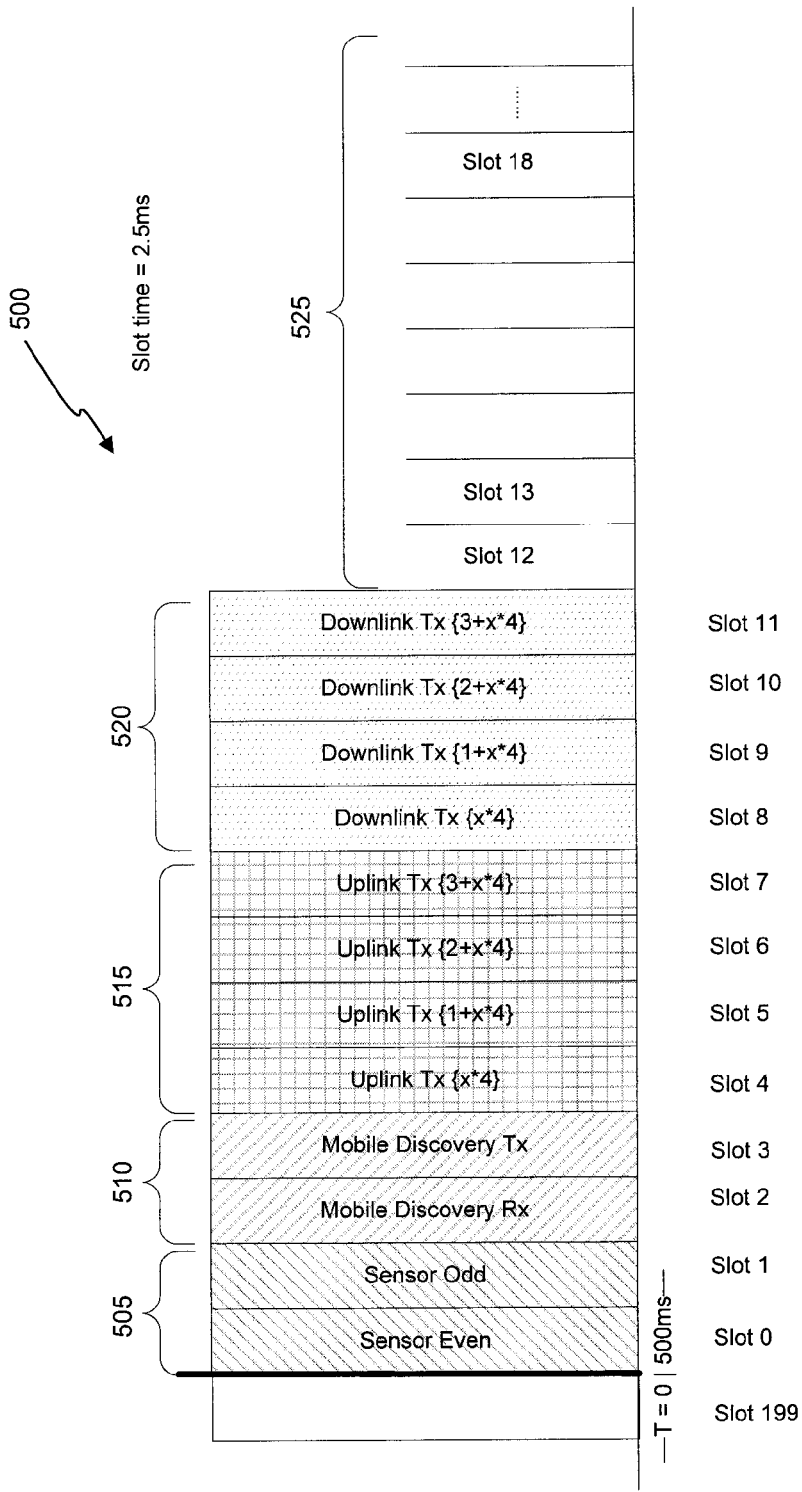
FIG. 5 depicts a superframe which includes timeslots during which various types of data may be transmitted within the sensor network of FIG. 1, in accordance with an embodiment of the present invention.

FIG. 5 depicts a superframe which includes timeslots during which various types of data may be transmitted within the sensor network in accordance with an embodiment of the present invention. According to this embodiment, the scheduling of data transmission is based upon a time division multiple access (TDMA) scheme. Superframe 500 is shown having a duration of 500 ms, and consisting of 200 slots (slots 0-199) of 2.5 ms each.

In an embodiment, slots 0-11 include assorted control data which may be used to support network operations. In particular, slot group 505 includes slot 0 for even ordinal nodes and slot 1 for odd ordinal nodes. This arrangement reduces the possibility of interference between adjacent nodes during sensing operations.

Slot group 510 is reserved for mobile node discovery operations such that slot 2 is for receiving and slot 3 is for transmission. In general, mobile command center nodes have reduced operational ranges since they are often implemented using omni-directional antennas (although this is not a requirement). In many cases, mobile command center 125 is a node which communicates with a limited number of nodes 0-11 (FIG. 1) and, in some cases, communicate with only a single node at any given time.

For example, mobile command center 125 may transmit its preambles in slot 2 while the relevant node, of the fixed nodes 0-11, may be configured to determine the antenna segment to receive transmissions from the mobile command center. Slot 3 relates to fixed node preamble transmission, which may therefore be detected by a mobile command center scanning for such transmissions.

Slot group 515 includes four slots reserved for control traffic (including beacons) in the uplink direction. Since there is generally no physical layer broadcasting because of the use of directional antennas of the various nodes 0-11, control traffic may be sent to 1-hop neighbors so that each node in the sensor network receives the control traffic. In slot group 515, the slots are used by nodes with ordinal {x, x+1, x+2, x+3} respectively for values of x from 0 to the highest integer multiple of 4 in the ordinal set.

Slot group 520 includes four slots which are reserved for control traffic (including beacons) in the downlink direction. In this slot group, the slots are used by nodes with ordinal {x, x+1, x+2, x+3} respectively for values of x from 0 to the highest integer multiple of 4 in the ordinal set.

It is generally understood that capture effect includes the suppression of a weaker of two signals received at the receiver. Accordingly, when both signals are nearly equal in strength, or are fading independently, the receiver may switch from one signal to the other signal resulting in the phenomena known as picket fencing. If capture effect is not used, an additional two slots may be implemented to accommodate the additionally received signal. In such a scenario, slots 12 and 13 may be implemented for such information and data traffic may be included in slots 14-199. Otherwise, if capture effect is used, then slots 12-199 are available for data transmission by way of data slot group 525. For simplifying the system, no optimization may be applied to the control traffic to and from the first two and the last two nodes of superframe 500.

If data is not currently being transmitted, then control traffic may be repeated in the unused portions of the superframe (i.e., the slots normally used to transmit data) by repeating the control traffic schedule of slots 2-11, or slots 2-13 without capture effect.

Data frames, which are typically used to transfer data generated by the various nodes 0-11 (e.g., sensor data), may be exchanged by exploiting the concept of spatial reuse in slots 12-199, or slots 14-199 without capture effect.

In some embodiments, data transfer is responsive to a SEND SENSOR DATA command provided by command center 105. This command frame is typically used by the node to identify the direction (e.g., uplink or downlink) and data source node by ordinal number so that each node may know the transfer direction and be able to compute the appropriate transmission slots. As one example, data transmission occurs in either the uplink or downlink direction in alternating slots where: the source node (x) and all nodes in the set $\{x-4*(1+n)\}$ (where n=0, 1, 2 ... m and x-2-4*m is the largest integer smaller than the ordinal of the uplink command centre node (node '0')) transmit in the target direction in even slots. In odd slots, node x-2 and nodes in the set $\{(x-2)-4*(1+n)\}$ transmit in the target direction.

Scheduling

Figure 6:
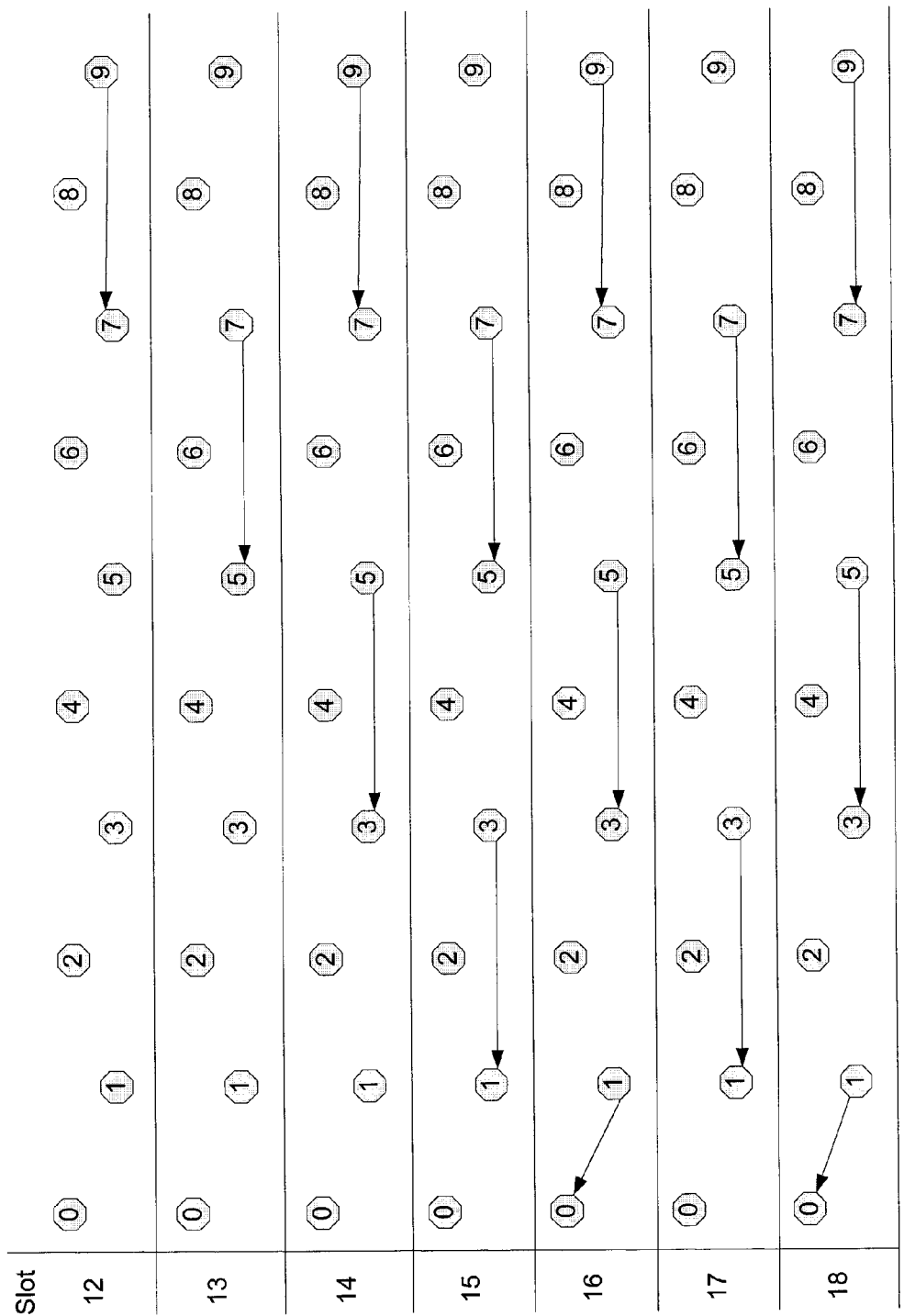
FIG. 6 depicts one method for scheduling data transmission in the sensor network of FIG. 1, in accordance with an alternative embodiment of the present invention.

FIG. 6 depicts one method for scheduling data transmission in a wireless network, such as sensor network 100 of FIG. 1, in accordance with an alternative embodiment of the present invention. This scheduling technique will be described with occasional reference to the sensor network and associated components depicted in FIG. 1, but it is understood that the disclosed technique is not limited to the depicted network, or any other network. It is further understood that the sensor network includes a plurality of nodes 0-11 successively located in an uplink direction and which provide a communication link to first access node 110. In addition, each given node of nodes 0-11 include a neighbor group having at least two nodes located within an effective wireless transmission range in the uplink direction of the given node.

In FIG. 6, slots 12-18 refer to the data transmission time slots of superframe 500, which is depicted in FIG. 5. Each slot 12-18 is shown with nodes 0-9, and the arrows reflect a data transmission between two nodes. This example therefore depicts uplink communication of data from node 9. For example, at the top-most slot 12, the arrow from node 9 to node 7 indicates that node 9 transmits data to node 7 during time slot 12. With this understanding, a data transmission and scheduling technique will now be described.

At a given time, command center 105 may instruct node 9 to transmit data. At this point node 9 (x=9) begins the process to transmit its sensor data to node 0 for uploading to command center 105. The first set $\{x, x-4*(1+n)\}$ yields $\{9, 5, 1\}$. The second set $\{(x-2), (x-2)-4*(1+n)\}$ yields $\{7, 3\}$.

In this example, slot occupancy is as follows:
Slot 12: Node 9→Node 7 (Nodes 5 and 1 have no data)
Slot 13: Node 7→Node 5 (Node 3 has no data)
Slot 14: Node 9→Node 7; Node 5→Node 3 (Node 1 has no data)
Slot 15: Node 7→Node 5; Node 3→Node 1
Slot 16: Node 9→Node 7; Node 5→Node 3; Node 1→Node 0
Slot 17: Node 7→Node 5; Node 3→Node 1

Slot 18: Node 9 →Node 7; Node 5 →Node 3; Node 1 →Node 0.

The slot schedule for slots 17 and 18 repeats until the sensor data (e.g., an image) is transferred to the first access node and ultimately command center 105.

For transfers in the downlink direction, the sets are {x, x+4*(1+n)} and {(x+2), (x+2)+4*(1+n)} for n=0 . . . m, x+2+4m being the smallest integer larger than the ordinal of the downlink command center 120.

In accordance with further embodiments, the forgoing may be further generalized as follows. One operation includes transmitting data from a transmitting node (e.g., node 9) to a receiving node (e.g., node 7) that is in an associated neighbor group of the transmitting node. This transmitting operation may occur during a first series of staggered time slots, such as during time slots 12, 14, 16, and 18.

Another operation includes receiving the data at the receiving node during the first series of staggered time slots. A further operation includes performing the forgoing transmitting and receiving operations for multiple transmitting nodes (e.g., nodes 5 and 1), and a corresponding multiple receiving nodes (e.g., nodes 3 and 0) during the first series of staggered time slots.

Various optional operations may be implemented in accordance with alternative embodiments of the present invention, and such operations will now be described. For instance, one optional operation includes transmitting data from a transmitting node (e.g., node 7) to a receiving node (e.g., node 5) in an associated neighbor group during a second series of staggered time slots, and then receiving the data at the receiving node during this second series of staggered time slots. The first and second series of staggered time slots are shown as being interlaced.

FIG. 6 makes clear that the receiving node in a previous time slot (e.g., node 7 in time slot 12) of the first series of staggered time slots is the transmitting node in a later time slot (e.g., node 7 in time slot 13) of the second series of staggered time slots.

If desired, the transmitting and receiving may be performed for multiple transmitting nodes, and a set of corresponding multiple receiving nodes, during the second series of staggered time slots.

In addition, procedures may be implemented to account for a failed or malfunctioning node. In such a case, the forgoing receiving and transmitting is repeated unless an expected receiving node of the associated neighbor group is identified as a failed node. In such as case, the received data is instead transmitted to an alternative receiving node of the associated neighbor group during a time slot of the first series of time slots. Consequently, the alternative receiving node receives such data during the time slot of the first series of time slots. Various techniques for handling node failure will be described in more detail with regard to later figures.

FIG. 7 depicts a parameter table which may be maintained (e.g., in the memory 218) by various nodes of the sensor network in accordance with embodiments of the present invention. In some cases, such parameters and other related data are useful to the functioning of the associated node. With regards to network communications, each node may include data relating to uplink and downlink neighbor nodes. The FIG. 7 example indicates that a given node includes a total of four neighbors, two uplink neighbors and two downlink neighbors. The depicted parameter table may therefore be increased or decreased to reflect the actual number of neighbors for a given node.

Data group 700 refers to data relating to a first neighbor node, and may include: (i) the MAC address (of the first neighbor node); (ii) the current node antenna sector to be used to communicate with the first neighbor node); (iii) link direction (uplink/downlink); (iv) hop status (one hop or two hops); (v) location coordinates of the first neighbor node (e.g., GPS coordinates). Data relating to the other neighbor nodes may be similarly included in the parameter table, and are depicted as data groups 705, 710, and 715.

The data depicted in FIG. 7 may be populated before or after network setup using any of a variety of different techniques including manual input, mobile configuration nodes, command frames provided by the command controller, and the like.

Failure Recovery

Since sensor network 100 utilizes wireless communications, which are prone to failure and malfunction, various recovery mechanisms may be implemented to handle link and node failures, for example. Several examples of such recovery mechanisms in accordance with various embodiments will now be described.

In one example, failure to receive a beacon frame from a neighbor node during m superframes may be interpreted as a node failure of the neighbor node. In this example, the detecting node may send a command frame, such as a neighbor fail notification command frame, to the command center closest to the failed node (e.g., command center 105). If the necessary communication link is broken as a result of the failed node, then the command frame may be sent to an alternate command center, such as second command center 120. Note that in some cases the failed node will be located further down the downlink direction such that second command center 120 will be the closest command center and the alternate command center will be command center 105.

If desired, action can be taken to replace the failed node and perform a new node insertion operation, or the ordinal sequence can be re-established using a single uplink or downlink neighbor node. Nodes with a single uplink or downlink neighbor node would therefore use the same neighbor for both command and data transfers.

During typical operations, each node transmits commands to 1-hop neighbor nodes and data to 2-hop neighbor nodes. However, the receipt of a neighbor fail notification command sent by a detecting node causes command center 105 to send a command, such as an UPDATE-NEIGHBOR-INFORMATION command, to each of the uplink and downlink neighbor nodes of the failed node. The receiving nodes consequently update their configuration data (e.g., parameters depicted in FIG. 7), to remove the failed node. In some cases, the updated nodes may send a message, such as an UPDATED-NEIGHBOR-TABLE notification, to command center 105.

Responsive to receiving this notification, the command center may issue a command, such as an initialization (INIT) command to the various nodes 0-11 (exclusive of the failed node) to re-establish the ordinal sequence of the nodes. Accordingly, in some cases, otherwise normal operation may then be resumed after command center 105 receives the RESUME SCHEDULING command sent by second command center 120, or by last node 11 when the second command center is not present.

Failed Node Scheduling

Figure 8:
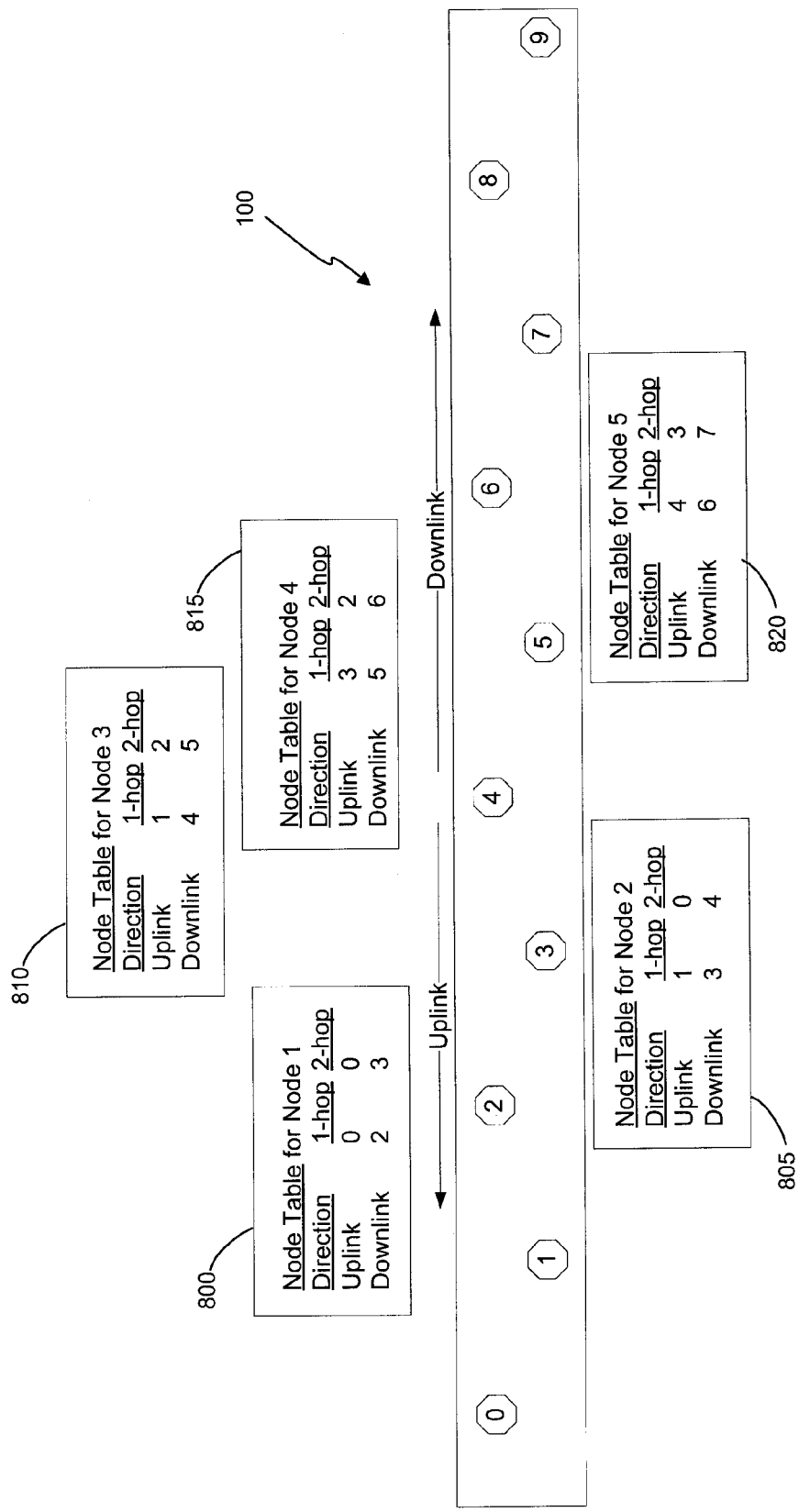
FIG. 8 depicts an exemplary node transmission path and possible neighbor node tables in a non-failed node condition in accordance with an embodiment of the present invention.

Consider now scheduling in circumstances where the sensor network includes a failed node. Reference is first made to FIG. 8, which depicts an exemplary node transmission path and possible neighbor node tables in a non-failed node condition in accordance with an embodiment of the present invention. If the ordinal number of the originating or initially transmitting node is even, a normally operating sensor network with all nodes present (i.e., each node having functioning 1-hop and 2-hop neighbor nodes) will transfer each packet along the even numbered 2-hop portion of the network until reaching the last node, or its predecessor in the special case of an end condition that may modify normal routing. Similarly, if the originating node is an odd number node, the node transmission path will be along the odd half of the chain of nodes.

FIG. 8 further shows sensor network 100 having nodes 0-9 (nodes 10 and 11 have been omitted for clarity). In this example, node 9 is the originating node that initially sends data obtained from an associated sensor, for example. Node tables 805, 810, 815, and 820 are shown for nodes 1, 2, 3, 4, and 5, respectively. Each node table identifies 1-hop and 2-hop neighbor nodes in both the uplink and downlink directions. A failed node condition will now be considered.

Figure 9:
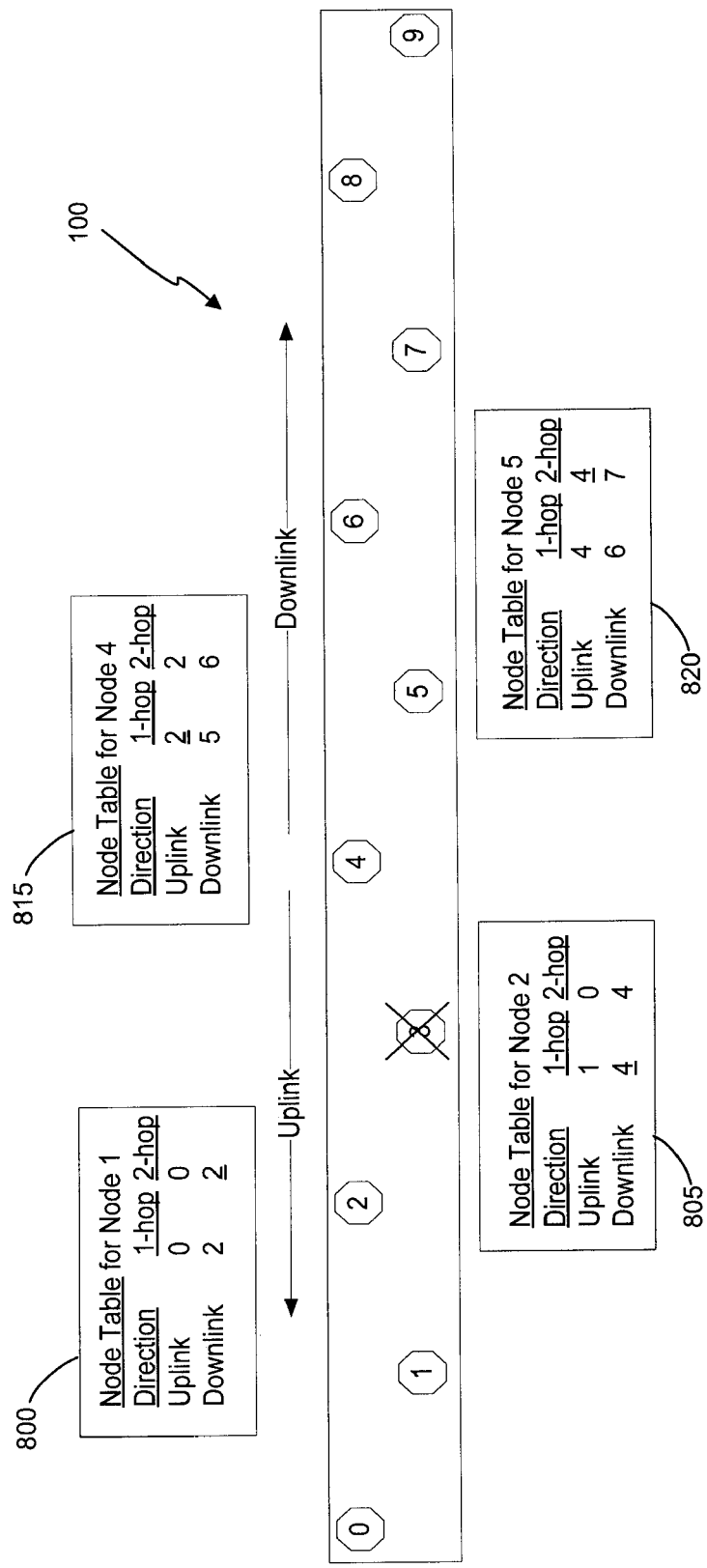
FIG. 9 depicts an exemplary node transmission path and possible neighbor node tables in the presence of a failed node condition in accordance with an embodiment of the present invention.

FIG. 9 depicts an exemplary node transmission path and possible neighbor node tables in the presence of a failed node condition in accordance with an embodiment of the present invention. In this example, node 3 is shown as the failed node.

Note that the various nodes tables of FIG. 9 are similar in many respects to the node table of FIG. 8. The primary distinctions relate to the updating of the node tables to reflect the failed node 3. In particular, FIG. 9 does not include a node table for node 3 since this node has failed. In addition, node tables 800, 805, 815, and 820 have been updated to reflect that node 3 has failed. For instance, in node 1, node table 800 now refers to node 2 for both the 1-hop and 2-hop neighbors. In addition, for node 2, node table 805 refers to node 4 for both the 1-hop and 2-hop neighbors. Node tables 815 and 820 are similarly updated. An exemplary scheduling technique using the preceding failed node 3 scenario will now be described with regard to FIG. 10.

Figure 10:
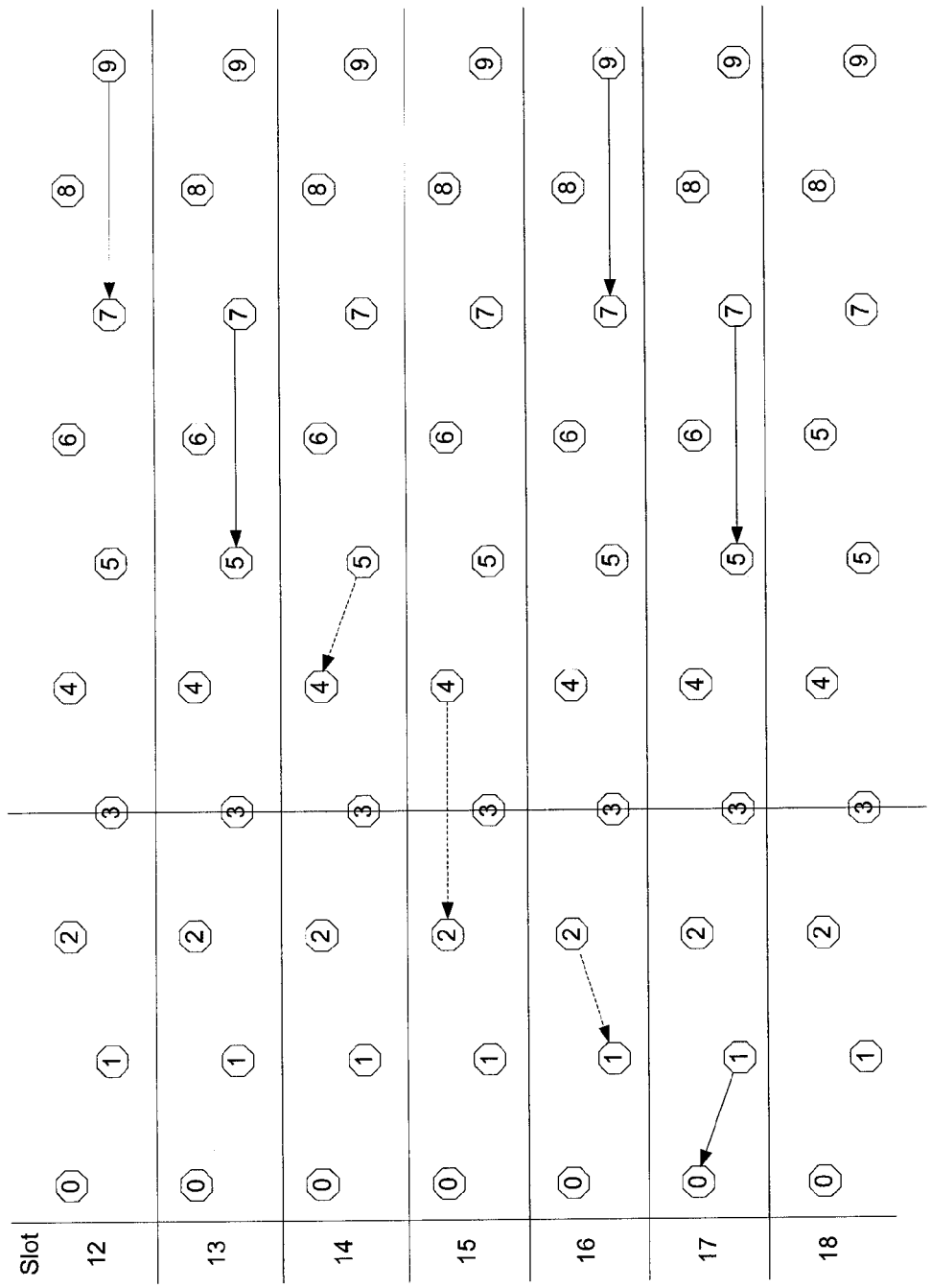
FIG. 10 depicts one method for scheduling data transmission during a failed node situation in the sensor network of FIG. 1, in accordance with another alternative embodiment of the present invention.

FIG. 10 depicts one method for scheduling data transmission during a failed node situation in a wireless network, such as sensor network 100 of FIG. 1, in accordance with an another alternative embodiment of the present invention. This scheduling technique is similar in many respects to the technique shown in FIG. 6. Distinctions between these techniques relate primarily to handling of the failed node condition, which is the failure of node 3 in the exemplary case of FIG. 10.

In FIG. 10 slot 13, node 5 is shown receiving the data frame from node 7. Ordinarily (i.e., in non-failed node conditions), node 5 would relay or otherwise transmit the received data to node 3. However, since node 3 is a failed node, various failed node operations are performed. In particular, when node 5 receives this data, it will in turn transmit the data to the uplink node 4, which is consistent with the node entry in node tale 820 (FIG. 9).

Note that any node with a double entry in the node table (e.g., node 4 being the 1-hop and the 2-hop neighbor node in both the uplink and downlink directions of node table 820), should listen on both the odd and even schedule slots in the expected direction. With this change, node 4 will listen when node 5 transmits on the odd node schedule and receives the data frame instead of node 3. Node 4 should also transmit on the odd schedule since the originator node was odd and the even nodes will be saving power on the even slots, except those nodes with double entry neighbors as noted above.

Node 2 upon receiving the data frame will typically check to identify the originator node ordinal to determine whether is should transmit on the even or odd half of the chain (and hence resulting in a cross over). The special case in this example is where node 2 could send directly to node 0, if so desired.

Node 2, recognizing that node 9 is the originator node, transmits the frame on the odd schedule where node 1 will be listening. From this point, normal (i.e., non-failed node) scheduling is performed.

In accordance with some embodiments, a more generalized method for node failure recovery in a wireless network having a plurality of nodes (e.g., nodes 0-9 of FIG. 10) successively located in a downlink direction relative to an access node will now be described. It is again understood that each given node of nodes 0-9 include a first neighbor group having nodes located within an effective wireless transmission range in the uplink direction of the given node and a second neighbor group having nodes located within an effective wireless transmission range in the downlink direction of the given node. Examples of such neighbor groups are illustrated by the various node parameter tables shown in FIGS. 8 and 9.

One operation includes detecting by a particular node (e.g., node 4) that a recurring communication, such as a periodic beacon, has not been received within a time period from a neighbor node (e.g., node 3). Again the neighbor node may be in either the uplink neighbor group or the downlink neighbor group.

Another operation includes communicating a first indicator to an appropriate entity, such as command center 105, for example, indicating that the neighbor node is a failed node. This indicator may be implemented as a neighbor fail notification command frame.

A further operation includes transmitting a command, such as an update neighbor information command, to all nodes in the first (uplink) neighbor group and the second (downlink) neighbor group of the failed neighbor node, causing such nodes to respectively update their node table to the extent that their uplink and downlink neighbor groups omit the failed neighbor node (e.g., node 3).

In some cases, some or all of the updated nodes may communicate an update notification to command center 105 notifying the completion of the update of an associated node table to reflect omission of the failed node 3.

If resequencing is desired, then another operation may include transmitting an initialization command successively in the downlink direction to each of nodes 0-2 and 4-9. In an embodiment, the initialization command reestablishes a relative sequence of the nodes.

In an embodiment, data frames that have crossed from the odd ordinal chain to the even, and vice versa, may be readily detected by the following method: (i) logical AND the frame source ordinal and the local node ordinal; and (ii) test the least significant bit (LSB)—if the LSB is non-zero then the frame has crossed. With regard to frame loss error recovery, retransmission using the foregoing spatial reuse techniques may also be implemented.

There are a number of failure cases where error recovery may be implemented. One case relates to node failure as described above. Another case is referred to as a loss of commands. It is first noted that each time slot of the superframe, including the command time slots, may include a duration of 2.5 ms. This duration is sufficient to transmit eight command frames during each time slot. Several strategies for recovering from loss of commands will now be discussed.

A first strategy includes configuring the nodes to acknowledge successful receipt of a command in a subsequent uplink or downlink transmission time slot. Failed command transmissions can therefore be repeated in a later command time slot in the event that a particular command is not acknowledged. The ability to transmit multiple command frames in each command slot provides sufficient capacity for any necessary retransmissions of the commands.

A second strategy includes repeating each command multiple times in a given time slot or within subsequent slots (e.g., in unused data time slots). The probability of command loss can therefore be reduced to a surprisingly low level by repeating these commands. A third strategy includes implementing a combination of the just-described first and second strategies.

Another failure case relates to data loss. For instance, failure to correctly receive a data frame typically interrupts the sequence of frames used to transfer data, such as an image, generated by an originating node. Since the data frames are commonly communicated in sequence (e.g., uplink direction toward command center 105), each of the nodes typically includes memory for storing the image or other data that is to be transmitted. Intermediate nodes, including relay nodes, will optimally include memory to buffer frames during retransmission attempts.

It is understood that with regard to the transmission of data frames, such data frames will include sequence numbers ordered starting with the lowest unacknowledged data frame. Any data frame not correctly received and not being within the sequence numbers of a subsequent transmission sequence is implicitly discarded and will not be delivered.

Mobile Node Discovery

Figure 11:
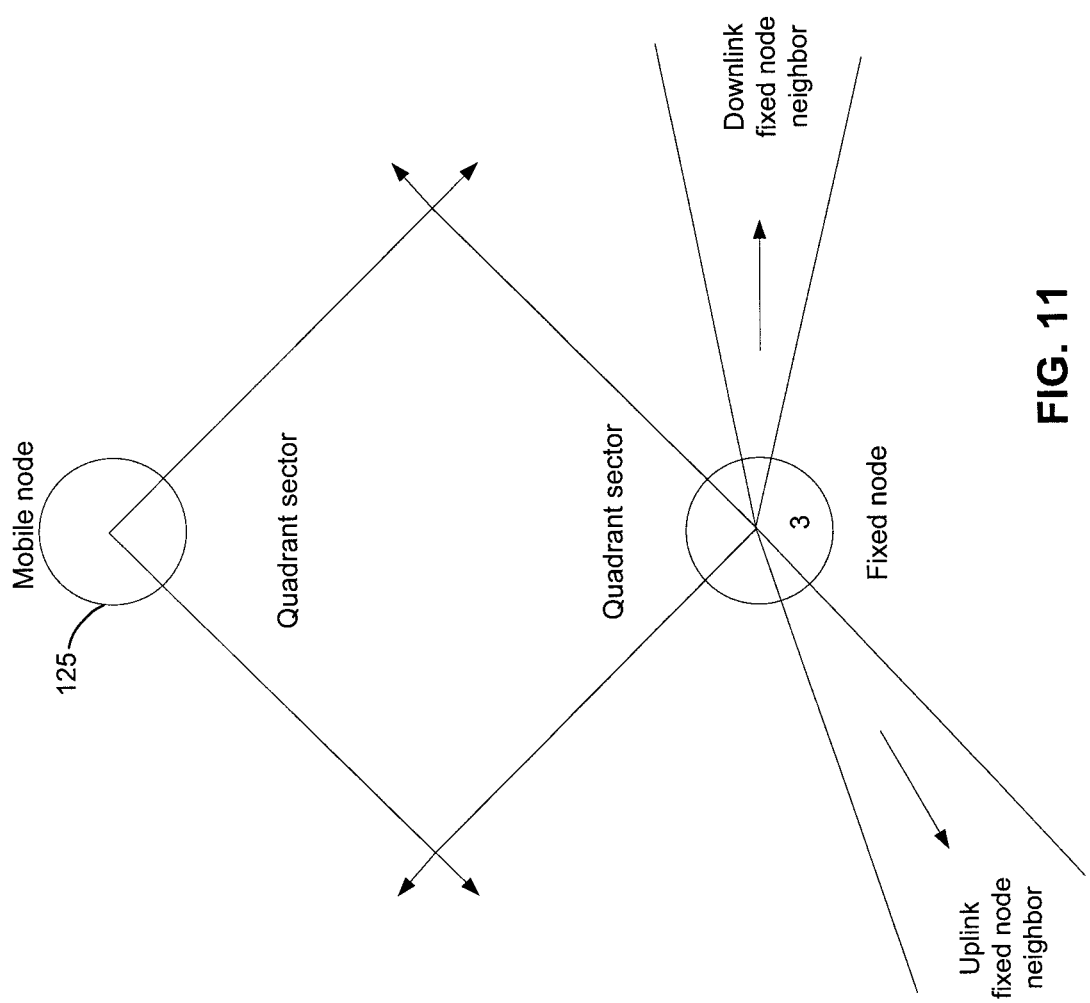
FIG. 11 provides an example of network discovery of a mobile command center, in accordance with still further embodiments of the present invention.

FIG. 11 provides an example of network discovery of a mobile command center. In particular, such embodiments of the present invention relate to techniques facilitating network discovery of a mobile command center. Discovering a mobile command center poses interesting challenges in situations in which various fixed nodes 0-11 of sensor network 100 utilize segmented directional antennas on the fixed nodes.

In one implementation, a mobile command center, such as mobile node 125, utilizes an omni-directional or quadrant (4 segments instead of a larger number of segments as in a typical node) in order to improve node discovery time. Using segmented directional antenna patches on both the fixed nodes 0-11 and the mobile node could take significantly long time periods to establish communications because of the time necessary to align the antenna segments of the node and mobile command center. Alternatively or additionally, the nodes may be configured to transmit preambles on a periodic or other basis to facilitate detection of the mobile command centers.

Further configurations include transmitting multiple messages with the message number included in the message, and a combination of transmitting preambles and transmitting multiple messages.

In one embodiment, mobile node 125 includes an antenna having a quadrant mode in which antenna gain can be 6 dB less than the gain in the default directional segment mode, while still transmitting at an allowed effective isotropic radiated power (EIRP). One feature of this configuration permits a larger azimuth of about 90 degrees without sacrificing range. The mobile node can also receive in this mode, but the range me be somewhat reduced (e.g., reduced to about 40 meters). This mode may be used for mobile node discovery to reduce discovery time.

Various configurations are possible in accordance with various embodiments of the present invention. With regard to sectored antennas (quadrant mode), four antenna sectors may be merged into one quadrant for communication. This arrangement results in five quadrants from the typically available antenna sectors (e.g., 4-18 sectors).

Another case relates to the situation in which mobile node 125 has knowledge of the location of itself and a fixed node, such as node 3. This location information may include GPS coordinates of these nodes. In this embodiment, the mobile command center can calculate the antenna sectors (e.g., three or more sectors typically under optimal circumstances) that the mobile node will use to communicate. According to this arrangement, the worst case node discovery time may be calculated as follows:

$$5*3*0.5 \text{ seconds} = 7.5 \text{ seconds}$$

Where 5 represents the number of quadrants of the mobile node and 3 is the number of antenna sectors.

Yet another case relates to automatic mobile node discovery during which a fixed node, such as node 3, transmits beacons on each of its overlapping quadrants (e.g., 5 quadrants) in the mobile node discovery transmit slot. Node 3 also looks for beacons from the mobile node in the same quadrant in the mobile node discovery receive slot. This process of discovery is typically once per superframe. The pattern may be repeated on a periodic or other basis until the mobile node is detected or until a timeout threshold has been reached, for example.

In one embodiment, mobile node 125 dwells in each quadrant for five superframe periods, and listens until it detects a beacon from a transmitting node such as node 3 as depicted in the figure. After the mobile node receives the beacon, it synchronizes and then also transmits a beacon. In the preferred embodiment of the invention, the worst case node discovery time in this example is:

$$5*5*0.5 \text{ seconds} = 12.5 \text{ seconds}.$$

Where one 5 relates to the number of quadrants of the fixed node and the other 5 relates to the number of superframe periods that the mobile node dwells in a particular quadrant. This technique is relatively flexible, but is somewhat slower than other discovery methods.

Referring still to FIG. 11, a more generalized example of a mobile node discovery process will now be described. In this example, a sensor network, such as sensor network 100 (FIG. 1), can discover or otherwise become aware of the presence of mobile node 125. It is understood that a plurality of nodes (e.g., two or more of nodes 0-11) each include a wireless transceiver and a directional antenna. Such nodes may be configured to wirelessly communicate via a respective directional antenna with at least one node of a first neighbor group in a first direction and at least one node of a second neighbor group in a second direction. Such aspects have been described in detail with regard to FIG. 1, for example.

In accordance with further embodiments, some or all of nodes 0-11 may be further configured to repeatedly transmit a beacon or other signal using different segments of their respective directional antennas. These repeated transmissions of a beacon signal may be accomplished by cycling through each antenna segment (e.g., one or more transmissions per segment) on a periodic or regular basis.

Mobile node 125 is typically configured to be operable at varying geographical locations relative to various nodes of the sensor network, such that the mobile node is positionable within an operational range of the sensor network. Upon receiving a beacon signal transmission from an associated node (e.g., node 3) the mobile node may operatively couple (e.g., establish wireless communications) with node 3. Typically, mobile node 125 will not receive all of the beacon signals transmitted by node 3, but rather will only receive beacon signals transmitted using a subset of all of the antenna segments (e.g., only 1-3 segments).

In an embodiment, the coupling between node 3 and the mobile node may be accomplished by establishing wireless communications between these devices using known communication protocols. Typically, node 3 will communicate with the mobile node using the same antenna segment used to transmit the beacon signal that was received by the mobile node.

In some embodiments, the sensor network is capable of utilizing information relating to a current physical or geographical location of mobile node 125. For example, the mobile node may communicate its location information to a particular command center (e.g., command center 105), which in turn communicates this information to the appropriate node or nodes 0-11. Once the nodes have received this information, then an intelligent decision may be made with regard to which segment or segments that a particular node should transmit the beacon signal to mobile node 125. In other words, since a node has knowledge of the location of the mobile node, then the node will know which segment of an associated directional antenna to use to transmit the beacon signal to the mobile node.

Figure 12:
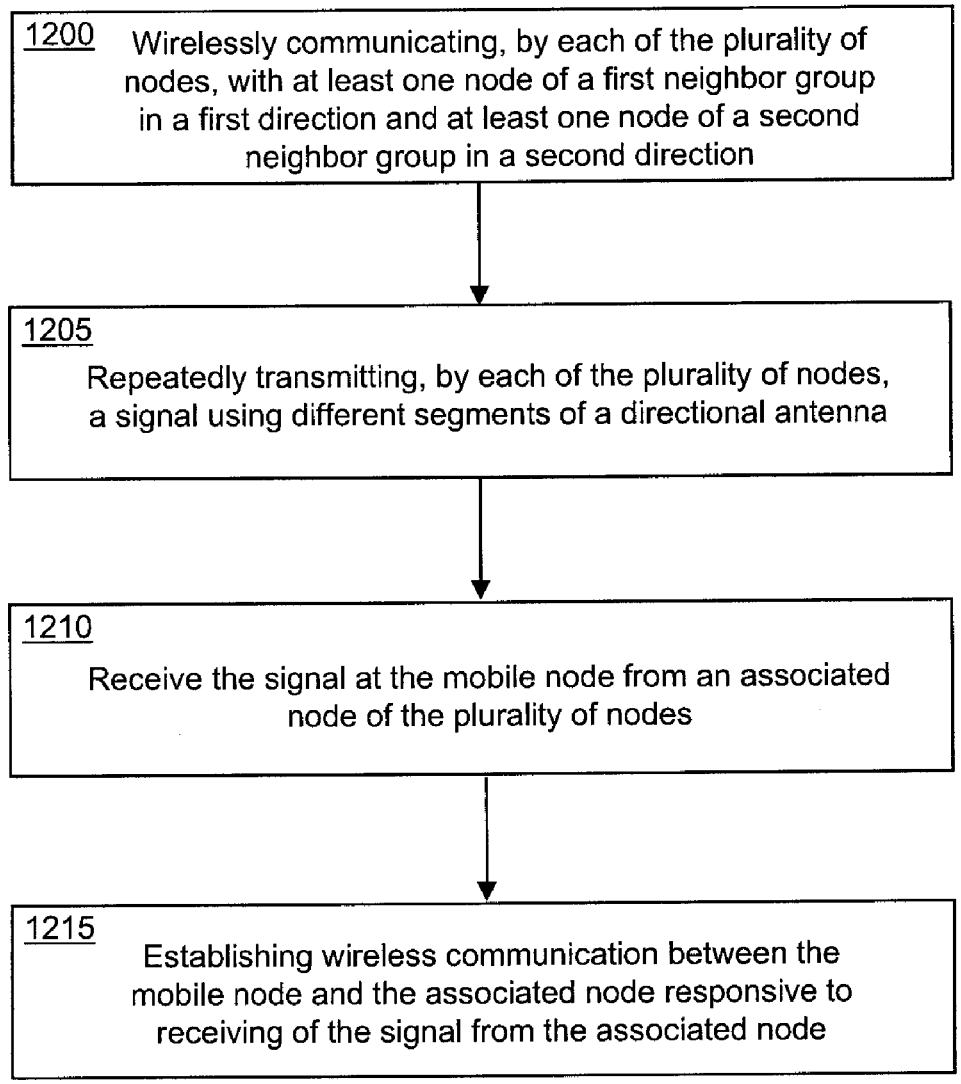
FIG. 12 is a flowchart depicting a method for discovering a mobile node, such as mobile command center, in accordance with an embodiment of the present invention.

FIG. 12 is a flowchart depicting a method for discovering a mobile node, such as mobile node 125, in accordance with an embodiment of the present invention. This method will be described with occasional reference to sensor network 100 and related components depicted in FIG. 1, but it is understood that the disclosed method is not limited to a sensor network, or any other system or network. In general, the mobile node operates in association with a sensor network (e.g., sensor network 100) having a plurality of nodes individually having a wireless transceiver and a directional antenna.

Block 1200 includes wirelessly communicating, by each of the plurality of nodes, with at least one node of a first neighbor group in a first direction and at least one node of a second neighbor group in a second direction. Using node 3 as an example, the first direction relates to the uplink direction and the first neighbor group includes nodes 1 and 2. Likewise, the second direction relates to the downlink direction and the second neighbor group includes nodes 4 and 5.

Block 1205 refers to repeatedly transmitting, by each of the plurality of nodes, a signal using different segments of the directional antenna. This signal is typically implemented as a beacon signal.

Block 1210 relates to receiving the signal at a mobile node (e.g., mobile node 125) from an associated node (e.g., node 3) of the plurality of nodes.

Block 1215 includes establishing wireless communication between the mobile node and the associated node responsive to receiving of the signal from the associated node.

Although these embodiments may be implemented using the exemplary series of operations described herein, additional or fewer operations may be performed. Moreover, it is to be understood that the order of operations shown and described is merely exemplary and that no single order of operation is required.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a selective combination thereof. In some cases, such embodiments are implemented by a controller which may include some or all of the components associated with digital system 204 of node 200. Some ASIC designs may be implemented as a stand-alone packaged device, or embedded as a soft Intellectual Property (IP) core in a larger system ASIC.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

While the invention herein disclosed has been described by means of specific embodiments, examples and applications thereof, numerous modifications and variations could be made thereto by those skilled in the art without departing from the scope of the invention set forth in the claims.

What is claimed is:

1. A sensor network comprising:
a first command center;
a first access node coupled to the command center and comprising a wireless transceiver;
a plurality of nodes individually comprising a wireless transceiver and a directional antenna, wherein each of the plurality of nodes is successively located in a downlink direction relative to the first access node, and is configured to wirelessly communicate via the directional antenna with at least one node of a first neighbor group in a downlink direction and at least one node of a second neighbor group in an uplink direction; and
a sensor device individually coupled to at least one of the plurality of nodes and configured to provide sensor data for the first command center;
wherein for each given node of the plurality of nodes, the first neighbor group of the given node comprises two nodes of the plurality of nodes and which are located in the uplink direction relative to the given node, and the second neighbor group of the given node comprises two nodes of the plurality of nodes and which are located in the downlink direction relative to the given node; and
wherein each node of the plurality of nodes is configured to selectively communicate sensor data provided by a non-adjacent downlink node, of the two nodes located in the downlink direction, to either a non-adjacent uplink node or an adjacent uplink node of the two nodes located in the uplink direction based upon operation criteria.

2. The sensor network of claim 1, wherein each node of the plurality of nodes is configured to communicate the sensor data provided by the non-adjacent downlink node, of the two nodes located in the downlink direction, to the non-adjacent uplink node of the two nodes located in the uplink direction.

3. The sensor network of claim 1, wherein the operation criteria identifies that the non-adjacent uplink node is a failed node, thus permitting the communicating of the sensor data to the adjacent uplink node.

4. The sensor network of claim 1, wherein each node of the plurality of nodes is configured to selectively receive the sensor data provided by either the non-adjacent downlink node or an adjacent downlink node of the two nodes located in the downlink direction based upon operation criteria.

5. The sensor network of claim 4, wherein the operation criteria identifies that the non-adjacent downlink node is a failed node, thus permitting the receiving of the sensor data from the adjacent downlink node of the plurality of nodes.

6. The sensor network of claim 1, wherein each node of the plurality of nodes that include the sensor device is configured to communicate the sensor data to the first command center via an uplink communication in the downlink direction with a node of the first neighbor group.

7. The sensor network of claim 1, wherein each node of the plurality of nodes is configured to receive the sensor data provided by a downlink node of the second neighbor group, and is further configured to communicate the sensor data to an uplink node of the first neighbor group.

8. The sensor network of claim 7, wherein the received sensor data provided by the downlink node is generated by a sensor device coupled to a node located in the downlink direction from the at least one node of the second neighbor group.

9. The sensor network of claim 1, wherein the directional antenna of at least one of the plurality of nodes comprises a plurality of segments, wherein a first one of the plurality of segments permits communications in the downlink direction and wherein a second one of the plurality of segments permits communications in the uplink direction.

10. The sensor network of claim 1 further comprising:
a second command center; and
a second access node coupled to the second command center, wherein the second command center and the second access node are located in the downlink direction relative to the first access node, and wherein the second access node is located to wirelessly communicate with a terminating node of the plurality of nodes.

11. The sensor network of claim 1 wherein the wireless transceiver of each of the plurality of nodes comprises a wideband transceiver which transmits and receives communication bursts having a bandwidth of at least two percent of a center frequency of the bursts.

12. The sensor network of claim 1 wherein the wireless transceiver of each of the plurality of nodes comprises a wideband transceiver which transmits and receives communication bursts having a bandwidth of at least ten percent of a center frequency of the bursts.

13. The sensor network of claim 1 wherein the wireless transceiver of each of the plurality of nodes comprises a wideband transceiver which transmits and receives communication bursts having a bandwidth of at least twenty percent of a center frequency of the bursts.

14. The sensor network of claim 1, further comprising:
a plurality of sensor devices individually coupled with one of the plurality of nodes, the plurality of sensor devices each providing sensor data for the first command center.

15. The sensor network of claim 1, wherein at least one of the plurality of nodes is coupled with a plurality of sensors, the plurality of sensors each providing sensor data for the command center.

16. The sensor network of claim 1, wherein the sensor device of at least one of the plurality of nodes is a sensor selected from the group consisting of: a temperature sensor, a light sensor, a motion sensor, and a radar sensor.

17. The sensor network of claim 1, wherein the first access node and the plurality of nodes define a linear network of wireless nodes.

18. The sensor network of claim 1 wherein each of the plurality of nodes is in a fixed location.

19. The sensor network of claim 1 wherein each of the plurality of nodes is configured to wirelessly and linearly communicate via the directional antenna with the at least one node of the first neighbor group in the downlink direction and the at least one node of the second neighbor group in the uplink direction.

20. A sensor network comprising:
a first command center;
a first access node coupled to the command center and comprising a wireless transceiver;
a plurality of nodes individually comprising a wireless transceiver and a directional antenna, each of the plurality of nodes being in a fixed location, wherein each of the plurality of nodes is successively located in a downlink direction relative to the first access node, and is configured to wirelessly communicate via the directional antenna with at least one node of a first neighbor group in a first direction and at least one node of a second neighbor group in a second direction; and
a sensor device individually coupled to at least one of the plurality of nodes and configured to provide sensor data for the first command center;
wherein for each given node of the plurality of nodes, the first neighbor group of the given node comprises two nodes of the plurality of nodes and which are located in the first direction relative to the given node, and the second neighbor group of the given node comprises two nodes of the plurality of nodes and which are located in the second direction relative to the given node; and
wherein each node of the plurality of nodes is configured to selectively communicate sensor data provided by a non-adjacent node in the second direction, of the two nodes located in the second direction, to either a non-adjacent node in the first direction or an adjacent node in the first direction of the two nodes located in the first direction based upon operation criteria.

21. The sensor network of claim 20 wherein each of the plurality of nodes is configured to wirelessly and linearly communicate via the directional antenna with the at least one node of the first neighbor group in the first direction and the at least one node of the second neighbor group in the second direction.

* * * * *